(12) United States Patent
Rusackas et al.

(10) Patent No.: US 10,687,227 B2
(45) Date of Patent: Jun. 16, 2020

(54) NETWORK OPERATION CENTER DASHBOARD FOR CLOUD-BASED WI-FI SYSTEMS

(71) Applicant: Plume Design, Inc., Palo Alto, CA (US)

(72) Inventors: Evan Rusackas, San Francisco, CA (US); Robert Miller, Menlo Park, CA (US); Patrick Li, Palo Alto, CA (US); Adam Hotchkiss, Burlingame, CA (US); Aman Singla, Saratoga, CA (US); William McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 213 days.

(21) Appl. No.: 15/782,912

(22) Filed: Oct. 13, 2017

(65) Prior Publication Data

US 2019/0116504 A1 Apr. 18, 2019

(51) Int. Cl.
*H04W 24/02* (2009.01)
*H04L 12/26* (2006.01)
(Continued)

(52) U.S. Cl.
CPC ......... *H04W 24/02* (2013.01); *H04L 41/0253* (2013.01); *H04L 41/12* (2013.01);
(Continued)

(58) Field of Classification Search
CPC ...... H04W 24/02; H04W 84/12; H04L 41/12; H04L 41/14; H04L 41/22; H04L 41/147; H04L 43/045; H04L 43/0876; H04L 43/0882; H04L 43/0888; H04L 43/0894; H04L 41/0253
See application file for complete search history.

(56) References Cited

U.S. PATENT DOCUMENTS

2012/0259965 A1\* 10/2012 Tsuzuki ............. H04L 41/0213
709/223
2014/0328190 A1  11/2014 Martin et al.
(Continued)

OTHER PUBLICATIONS

Feb. 14, 2019, International Search Report for International Application No. PCT/US2018/055263.

*Primary Examiner* — Ian N Moore
*Assistant Examiner* — Brian T Le
(74) *Attorney, Agent, or Firm* — Clements Bernard Walker; Lawrence A. Baratta, Jr.

(57) ABSTRACT

System and methods for managing a Wi-Fi network of a plurality of Wi-Fi networks from a cloud-based Network Operations Control (NOC) dashboard include, subsequent to creating an account for a user of the Wi-Fi network, receiving data associated with the Wi-Fi network from the one or more access points; providing a display associated with the Wi-Fi network based on the data, wherein the display comprises a network topology and one or more tabs providing information related to operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network.

29 Claims, 40 Drawing Sheets

(51) Int. Cl.
*H04L 12/24* (2006.01)
*H04W 84/12* (2009.01)

(52) U.S. Cl.
CPC .............. *H04L 41/14* (2013.01); *H04L 41/22* (2013.01); *H04L 43/045* (2013.01); *H04L 43/0876* (2013.01); H04L 41/147 (2013.01); H04L 43/0882 (2013.01); H04L 43/0888 (2013.01); H04L 43/0894 (2013.01); *H04W 84/12* (2013.01)

(56) References Cited

U.S. PATENT DOCUMENTS

| | | |
|---|---|---|
| 2015/0327272 A1 | 11/2015 | Fink et al. |
| 2015/0341797 A1 | 11/2015 | Madan et al. |
| 2015/0382208 A1 | 12/2015 | Elliott et al. |
| 2016/0043962 A1 | 2/2016 | Kim et al. |
| 2016/0254968 A1 | 9/2016 | Ebtekar et al. |
| 2017/0272965 A1 | 9/2017 | Kumar et al. |

\* cited by examiner

| TIMEFRAME | INPUTS | RESULTS |
|---|---|---|
| CREATED<br>07/26/17 • 01:00am • PDT<br>OPTIMIZED<br>07/26/17 • 01:00am • PDT<br>REQUEST ID<br>2497298702374087cf238928 | TOPOLOGY<br>(ORIGINAL)<br>(OPTIMIZED) | JOB ID:<br>2497298702374087cf2389<br>STATUS:<br>SUCCEED<br>DURATION<br>00:00:02 |

TIGGERS: (SCHEDULED)

STATS TABLES:

| CH GAIN 2.4GHz | CH GAIN 5GHz | INTERFERENCE | PERF PREDICT | EST PHY | OBS PHY |

*FIG. 16*

INTERFERENCE

| Node ID | Ch.1 | Ch.6 | Ch.11 | Ch.44 | Ch.157 |
|---|---|---|---|---|---|
| Living Room | 31.6 | 37.0 | 35.0 | 7.5 | 7.5 |
| Master Bedroom | 47.5 | 42.9 | 42.6 | 7.5 | 7.5 |
| Kitchen | 25.5 | 38.6 | 57.8 | 23.8 | 7.5 |
| Family Room | 27.6 | 40.0 | 58.2 | 7.5 | 7.5 |
| Basement | 22.8 | 32.6 | 53.8 | 7.5 | 7.5 |
| Study | 33.0 | 41.7 | 56.6 | 12.5 | 7.5 |

FIG. 45

PERFORMANCE PREDICTIONS

| Node ID | Nickname | 2.4GHz | 5GHz |
|---|---|---|---|
| P1K7021921:00 | Basement | 74.38 Mbps | 87.17 Mbps |
| P1K7020393:00 | Living Room | 31.19 Mbps | 54.11 Mbps |
| P1K7020964:00 | Study | 64.28 Mbps | 86.69 Mbps |
| P1K7022837:00 | Kitchen | 46.57 Mbps | 49.81 Mbps |
| P1K7020862:00 | Master Bedroom | 57.93 Mbps | 317.94 Mbps |
| P1K7021926:00 | Family Room | 21.7 Mbps | 55.19 Mbps |

NETWORK OPERATION CENTER DASHBOARD FOR CLOUD-BASED WI-FI SYSTEMS

FIELD OF THE DISCLOSURE

The present disclosure generally relates to networking systems and methods. More particularly, the present disclosure relates to Network Operation Center (NOC) dashboard systems and methods for cloud-based Wi-Fi systems.

BACKGROUND OF THE DISCLOSURE

Conventional Wi-Fi networks are deployed by users in their residences to provide network connectivity to various devices (e.g., mobile devices, tablets, televisions, Internet of Things (IoT) devices, laptops, media players, and the like). The users obtain network connectivity from their service provider, e.g., Multiple Systems Operators (MSOs), wireless providers, telecom providers, etc. From the service provider perspective, the network connectivity is conventionally seen to the gateway, i.e., cable modem, Digital Subscriber Loop (DSL) modem, wireless Access Point (AP), etc. Conventional Wi-Fi networks are added by the end user, and there is no visibility into the operation of such networks by the service provider. Service providers and their customers are no longer viewing their network connectivity as ending at the gateway, such as due to the deployment of service provider applications ("apps") on user devices. It is no longer acceptable for these service providers to troubleshoot network problems only to the gateway. Their customers expect a working network connection to the end user device. Thus, there is a need to provide service providers tools and techniques to view, monitor, and troubleshoot Wi-Fi networks.

BRIEF SUMMARY OF THE DISCLOSURE

In an exemplary embodiment, a method of managing a Wi-Fi network of a plurality of Wi-Fi networks from a cloud-based Network Operations Control (NOC) dashboard includes, subsequent to creating an account for a user of the Wi-Fi network, onboarding one or more access point devices associated with the Wi-Fi network in the NOC dashboard; receiving data associated with the Wi-Fi network from the one or more access points; providing a display associated with the Wi-Fi network based on the data, wherein the display includes a network topology and one or more tabs providing information related to operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network. The one or more access point devices can include a plurality of devices, and wherein the onboarding can include providing a unique identifier of a device and automatically associated all of the plurality of devices to the account based on the unique identifier. The onboarding can include inputting one of serial numbers and Media Access Control (MAC) address for the one or more access point devices in the NOC dashboard. The onboarding can include receiving an indication of an association between the account and the one or more access point devices from the Wi-Fi network. Subsequent to the receiving, the method can further include storing the data for the Wi-Fi network in a secure manner which is accessible only in the NOC dashboard based on user permission.

The performing can include one or more of establishing or changing a Service Set Identifier (SSID) of the Wi-Fi network and establishing or changing a password for accessing the Wi-Fi network. The performing can include setting of network parameters of the Wi-Fi network including one or more of Domain Name System (DNS) settings, Universal Plug and Play (UPnP), Dynamic Host Configuration Protocol (DHCP) reservations, bridge versus router mode, and port forwarding settings. The performing can include causing a specific access point device to provide an indicator for locating by a local user. The display can provide graphs of one or more metrics associated with the Wi-Fi network. The display can provide aggregated network-wide statistics and alarms for the plurality of Wi-Fi networks. The display can provide network-wide statistics and alarms for the Wi-Fi network, wherein the network-wide statistics can include a graph of channels used in the Wi-Fi network. The Wi-Fi network can include a distributed Wi-Fi network, and wherein the network topology graphically illustrates client links and backhaul links between a plurality of access point devices. The one or more tabs can display information related to the one or more access point devices and related to wireless links, wherein a health score is displayed for each of the one or more access point devices and the wireless links, and wherein the health score is a weighted combination of a plurality of factors. The one or more tabs can include a topology time machine which graphically illustrates a topology of the Wi-Fi network and changes over a specified time period. The one or more operations can include an optimization of the Wi-Fi network, and wherein the one or more tabs can include a status of the optimization, a history of optimizations, and statistics associated with the optimization.

In another exemplary embodiment, an apparatus executing a cloud-based Network Operations Control (NOC) dashboard for management of a Wi-Fi network of a plurality of Wi-Fi networks includes a network interface communicatively coupled to the plurality of Wi-Fi networks; a processor communicatively coupled to the network interface; and memory storing instructions that, when executed, cause the processor to, subsequent to creation of an account for a user of the Wi-Fi network, onboard one or more access point devices associated with the Wi-Fi network in the NOC dashboard; receive data associated with the Wi-Fi network from the one or more access points; provide a display associated with the Wi-Fi network based on the data, wherein the display includes a network topology and one or more tabs provide information related to operation of the Wi-Fi network; update the display based on one or more inputs received, wherein the display is updated in one or more of the network topology and the one or more tabs; and perform one or more operations via the NOC dashboard to one of manage, control, and troubleshoot the Wi-Fi network. The one or more operations can include one or more of establishing or changing a Service Set Identifier (SSID) of the Wi-Fi network and establishing or changing a password for accessing the Wi-Fi network. The one or more operations can include setting of network parameters of the Wi-Fi network including one or more of Domain Name System (DNS) settings, Universal Plug and Play (UPnP), Dynamic Host Configuration Protocol (DHCP) reservations, bridge versus router mode, and port forwarding settings.

In a further exemplary embodiment, a non-transitory computer-readable storage medium having computer readable code stored thereon for programming a computer to perform the steps of, subsequent to creating an account for a user of the Wi-Fi network, onboarding one or more access point devices associated with the Wi-Fi network in the NOC dashboard; receiving data associated with the Wi-Fi network from the one or more access points; providing a display associated with the Wi-Fi network based on the data, wherein the display can include a network topology and one or more tabs providing information related to operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network. The one or more operations can include one or more of establishing or changing a Service Set Identifier (SSID) of the Wi-Fi network and establishing or changing a password for accessing the Wi-Fi network.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 4 is a block diagram of a mobile 300, which may be used for the user device in the distributed Wi-Fi system of FIG. 1 or the like;

FIG. 16 is a screenshot of a tile for a performed optimization;

FIG. 45 is a screenshot of a table illustrating the percentage of air time consumed by interference at each access point on each frequency channel;

FIG. 46 is a screenshot of a table illustrating the predicted performance (throughput) that clients could achieve if they were connected to the given access point in the table on the frequency band indicated;

FIG. 47 is a screenshot of a table illustrating the estimated PHY rate for all potential connections between access points on all possible frequency channels;

FIG. 48 is a screenshot of a table illustrating the actual measured PHY rates for all potential connections between access points on all possible frequency channels.

DETAILED DESCRIPTION OF THE DISCLOSURE

Figure 1:
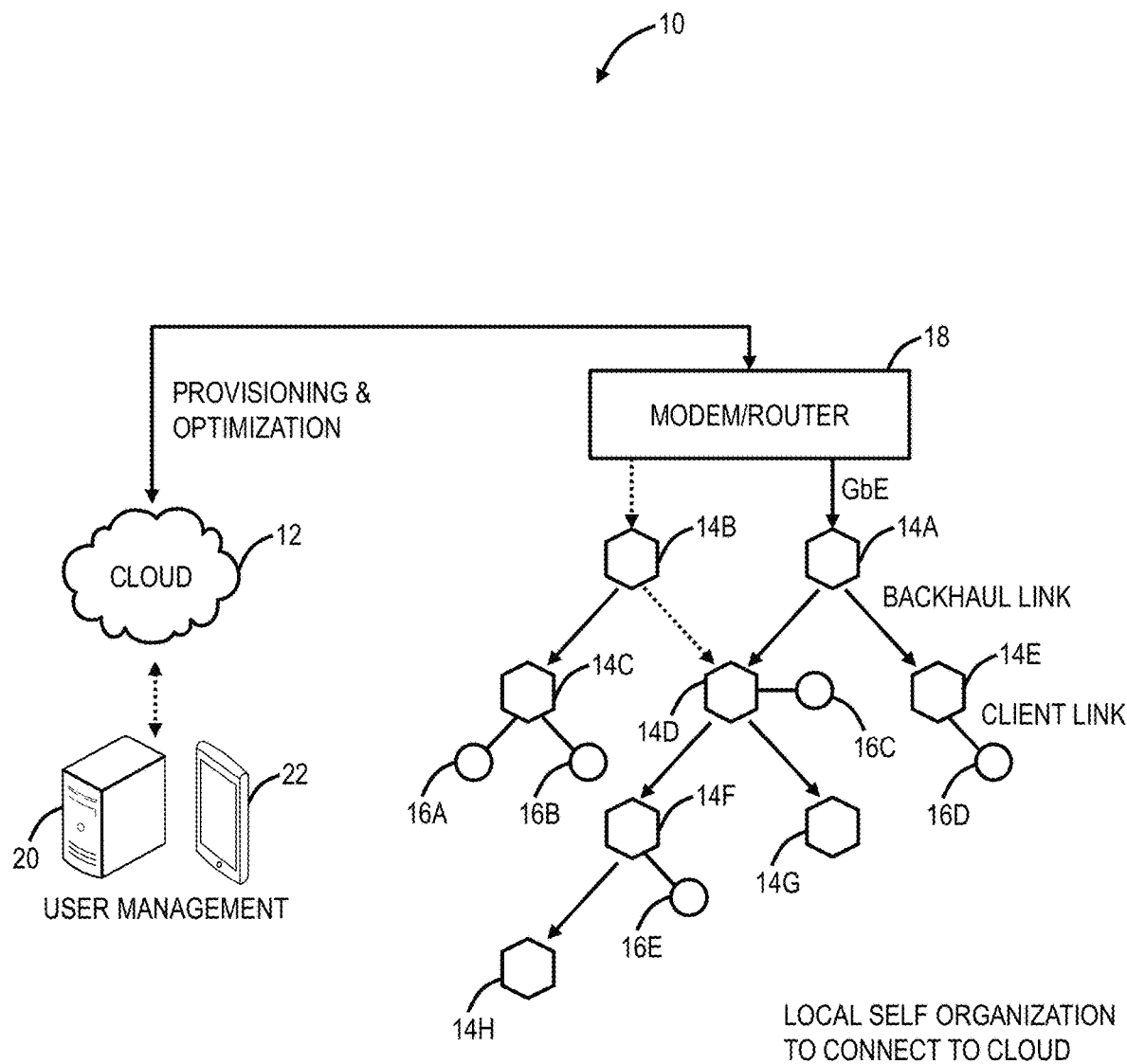
FIG. 1 is a network diagram of a distributed Wi-Fi system with cloud-based control and management.

In various exemplary embodiments, the present disclosure relates to Network Operation Center (NOC) dashboard systems and methods for cloud-based Wi-Fi systems. The systems and methods provide network visualizations in a dashboard for a service provider to view Wi-Fi networks in a plurality of locations (e.g., millions of homes). The dashboard includes various metrics and displays thereof as well as settings and controls for cloud-based Wi-Fi network control.

The NOC dashboard is a user interface, e.g., web-based, application-based, etc. connected to multiple Wi-Fi networks via the cloud. The NOC dashboard can be used by network operations, technical support personnel, etc. An objective of the NOC dashboard is to provide service providers visibility from their NOC to end user's client devices. That is, make Wi-Fi visible to service providers. Thus, the NOC dashboard can monitor and manage various Wi-Fi devices (access points, mesh devices, repeaters, etc.) providing Key Performance Indicators (KPIs) and visibility to each connected device.

The systems and methods enable a service provider to view Wi-Fi networks as a whole, assessing bulk properties such as average Wi-Fi data rates, % of homes with a given Wi-Fi data rate, % of homes with coverage problems, % of homes with interference issues, etc. Accordingly, the systems and methods allow the service provider to assess how well Wi-Fi is working in their network. For example, the systems and methods can guide the service providers to determine generally whether the Wi-Fi capability is adequate or whether there is a need to invest more into Wi-Fi systems.

The systems and methods enable a service provider to create groups of Wi-Fi networks, such as customers with different types of service, customers with different or the same types of gear in their home, customers who have been in contact with customer support, etc. These groups can then be analyzed for commonalities in terms of their Wi-Fi behavior. The dashboard can be used as an "upsell" or "churn prevention" tool, identifying those customers with poor Wi-Fi experience, and identifying the most likely cause or remedy for the situation. The service provider can then attempt to upsell the customer to that solution or can upgrade the solution for free in order to prevent the customer from changing (churning) to a new provider due to a poor experience.

The dashboard can be used for customer support. If a customer calls, emails, texts, etc., a service representative can call up the customer's account live or off-line to help diagnose any problem. The extensive data provided in the dashboard allows support personnel to identify fixes such as a) moving where the APs are located, b) changing networking settings such as router vs. bridge mode, c) adding additional APs to the network, d) making adjustments to the clients in the home (settings, location, etc.), e) manually adjusting frequency channels or topologies (connections between APs), f) running diagnostic speed tests, g) checking the history of speed tests, interference levels, data rates, packet errors, etc., and the like.

Distributed Wi-Fi System

Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/ router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
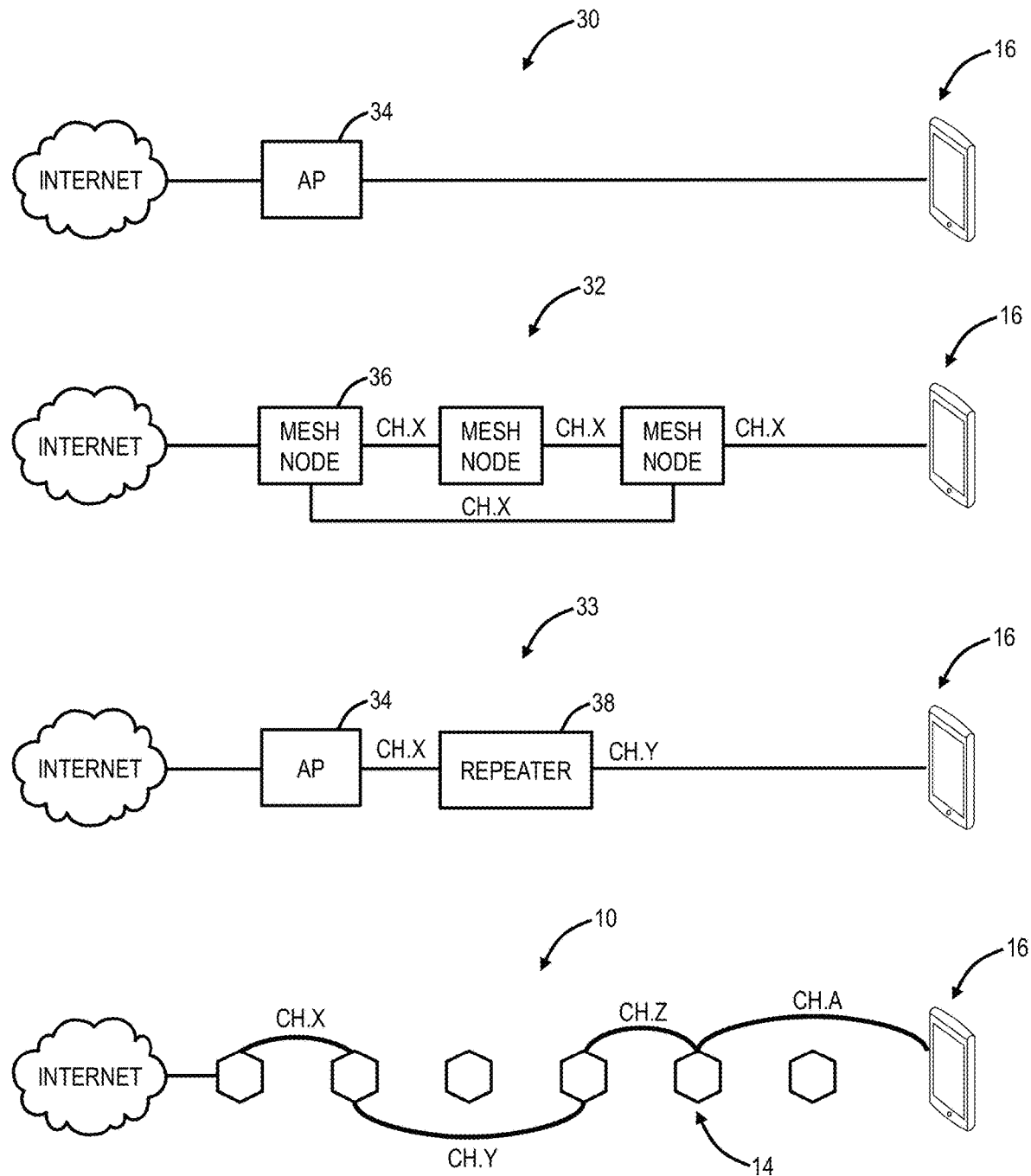
FIG. 2 is a network diagram of differences in operation of the distributed Wi-Fi system of FIG. 1 relative to a conventional single access point system, a Wi-Fi mesh network, and a Wi-Fi repeater network.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Cloud-Based Wi-Fi Management

Conventional Wi-Fi systems utilize local management such as where a user on the Wi-Fi network connects to a designated address (e.g., 192.168.1.1, etc.). The distributed Wi-Fi system 10 is configured for cloud-based management via the servers 20 in the cloud 12. Also, the single access point system 30, the Wi-Fi mesh network 32, and the Wi-Fi repeater network 33 can support cloud-based management. For example, the APs 34 and/or the mesh nodes 36 can be configured to communicate with the servers 20 in the cloud 12. This configuration can be through a software agent installed in each device or the like. As described herein, cloud-based management includes reporting of Wi-Fi related performance metrics to the cloud 12 as well as receiving Wi-Fi related configuration parameters from the cloud 12. The NOC systems and methods contemplate use with any Wi-Fi system (i.e., the distributed Wi-Fi system 10, the single access point system 30, the Wi-Fi mesh network 32, and the Wi-Fi repeater network 33, etc.) including systems that only support reporting of Wi-Fi related performance metrics (and not supporting cloud-based configuration).

The cloud 12 utilizes cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Exemplary Server Architecture

Figure 3:
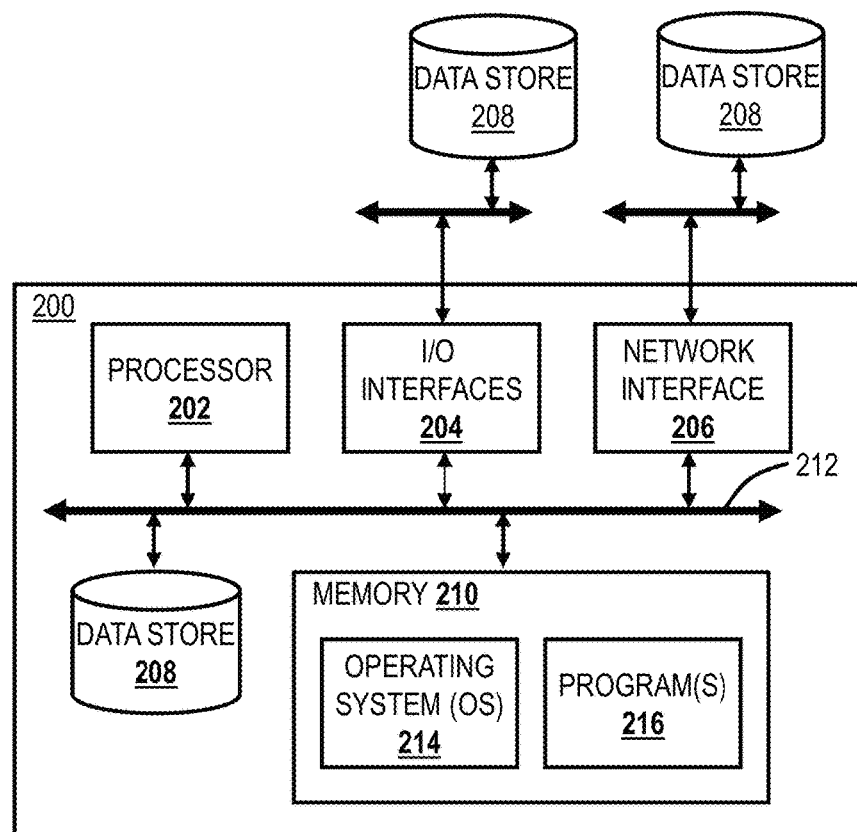
FIG. 3 is a block diagram of a server which may be used in the cloud, in other systems, or standalone.

Referring to FIG. 3, in an exemplary embodiment, a block diagram illustrates a server 200 which may be used in the cloud 12, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 4:
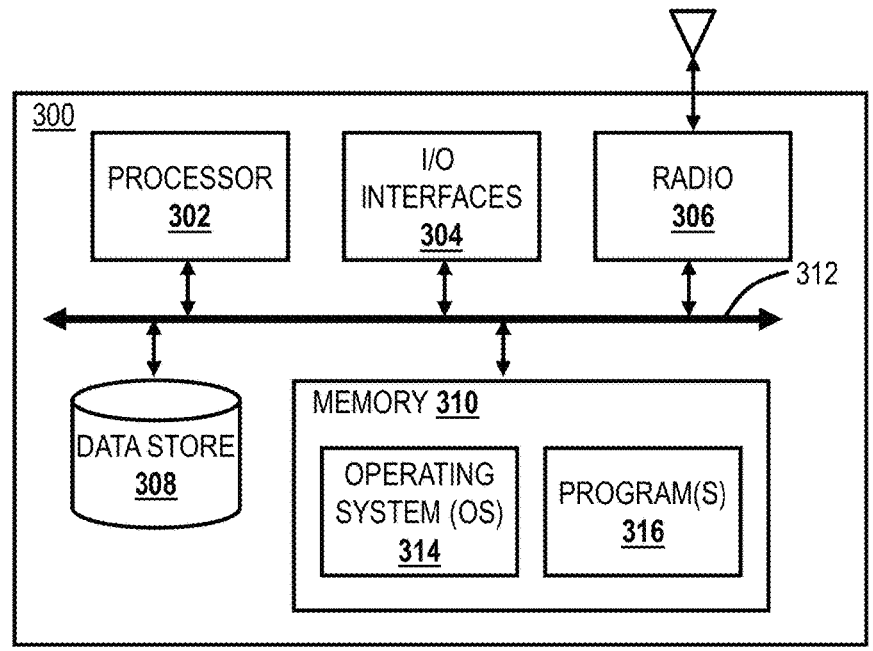

Referring to FIG. 4, in an exemplary embodiment, a block diagram illustrates a mobile device 300, which may be used for the user device 22 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 4 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network.

Cloud-Based NOC Process

Figure 5:
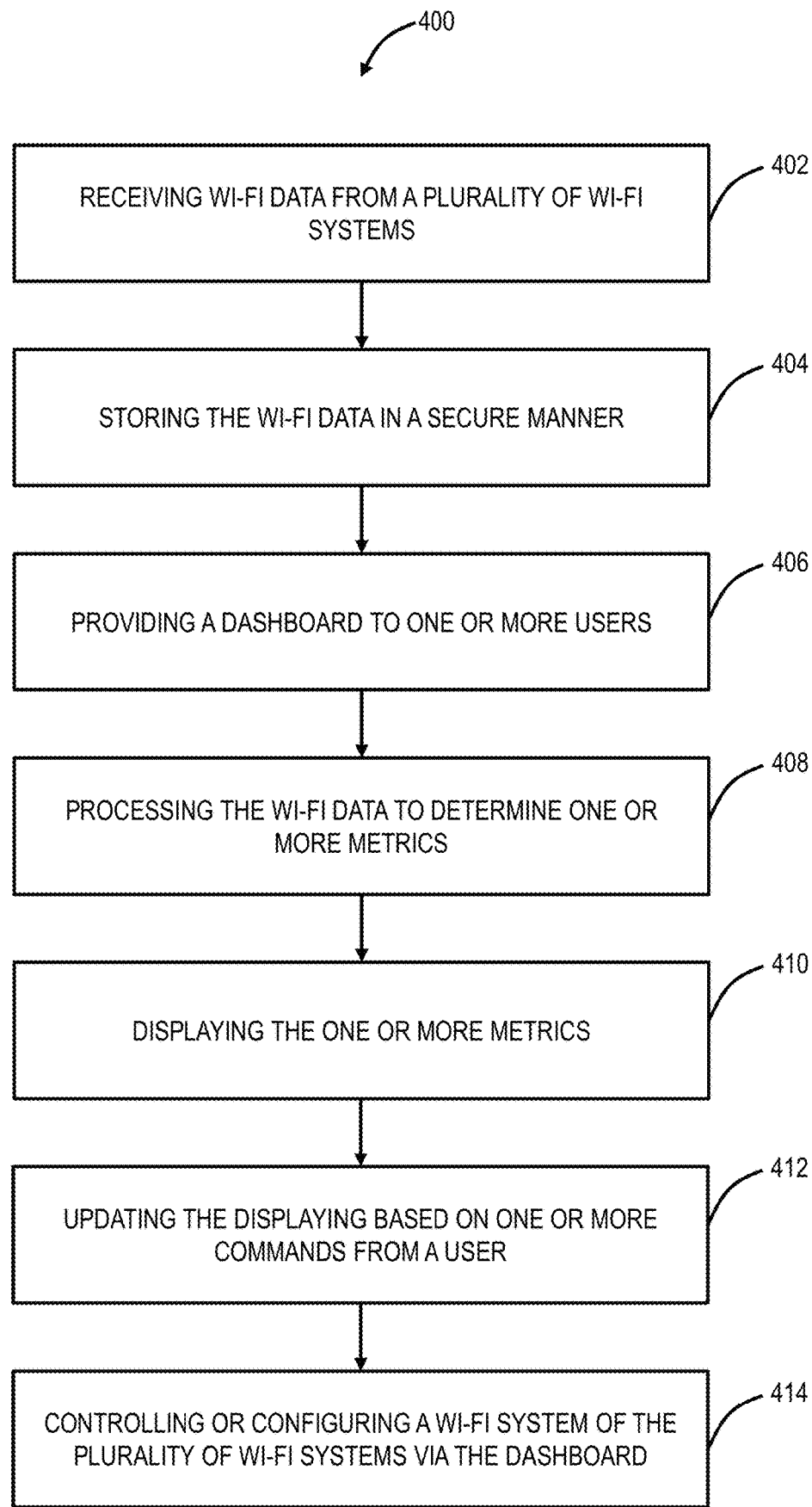
FIG. 5 is a flowchart of a cloud-based Network Operation Center (NOC) process.

Referring to FIG. 5, in an exemplary embodiment, a flowchart illustrates a cloud-based NOC process 400. The cloud-based NOC process 400 is implemented in the cloud 12, such as at one of the servers 20, based on communication with a plurality of Wi-Fi systems such as the distributed Wi-Fi system 10, the single access point system 30, the Wi-Fi mesh network 32, the Wi-Fi repeater network 33, and the like. The cloud-based NOC process 400 includes receiving Wi-Fi data from a plurality of Wi-Fi system (step 402). The Wi-Fi data can be referred to as measurement data and can include any relevant data associated with Wi-Fi operation such as Received Signal Strength Indicator (RSSI), achievable data rates, capacity, load, error rates, delays, interference, fractions of time spent transmitting and receiving, clients related information, and the like. For example, a description of data gathering in a Wi-Fi system is described in commonly assigned U.S. patent application Ser. No. 15/462,071, filed on Mar. 17, 2017, and entitled "DATA GATHERING TO ENABLE THE OPTIMIZATION OF DISTRIBUTED WI-FI NETWORKS," the contents of which is incorporated by reference.

The cloud-based NOC process 400 includes storing the Wi-Fi data in a secure manner (step 404). The Wi-Fi data can be stored in the data store 208. The secure manner includes encryption such that only the NOC can view the data. Further, the secure manner can include some or all of the Wi-Fi data being anonymized to remove user identifiable information, such as clients, etc. Further, a user in the cloud-based NOC process 400 can require authentication to be able to display metrics to ensure security.

The cloud-based NOC process 400 includes providing a dashboard to one or more users (step 408). For example, the server 20 can display the dashboard as a Graphical User Interface (GUI) to the user device 22 or the like. The dashboard can be displayed in an NOC or remotely to an authorized user. In an exemplary embodiment, the dashboard is presented as part of an application which implements the systems and methods. In another exemplary embodiment, the dashboard is presented in a browser, such as via HTTP/HTTPS.

The cloud-based NOC process 400 includes processing the Wi-Fi data to determine one or more metrics (step 408), displaying the one or more metrics in the dashboard (step 410), and updating the displaying based on one or more commands from a user (step 412). Specifically, the dashboard is interactive allowing the user to see network-wide metrics down to individual networks or APs. Steps 408-412 include updates to the GUI based on user input and associated processing. The Wi-Fi data can include aggregated network-wide statistics used to derive network-wide metrics, and the user can drill down to groups or individual accounts.

The cloud-based NOC process 400 can be used to manage devices, networks, groups of devices, groups of networks, accounts, groups of accounts, etc. That is, the cloud-based NOC process 400 contemplates various groupings for management purposes. In practical applications, the cloud-based NOC process 400 can manage thousands to millions of devices, each in a corresponding network and associated with accounts. As described herein, a Wi-Fi network is made up of one or more devices (e.g., access points 14, 34, 36, 38). An account represents a user identification which is the owner of a Wi-Fi network. Those skilled in the art will recognize various combinations are contemplated.

Wi-Fi Metrics in the Dashboard

Referring to FIGS. 6-16, in various exemplary embodiments, screenshots illustrate various GUIs in the dashboard and in the cloud-based NOC process 400. The dashboard can include various information to display the metrics including graphs, tables, numbers, etc. The graphs can be selected to show the 2.4 GHz and/or 5 GHz bands as well as include default and selectable timescales (e.g., one day, one week, etc.). Also, different lines on each graph can separate Transmit (Tx) versus Receive (Rx) (upload versus download) statistics.

The dashboard can be used to indicate the current state and history of the Wi-Fi network providing information such as how long each device has been connected, per node Graph, channel utilization, bandwidth usage, speed test history, alarms, channel utilization, a listing of disconnected devices, and the like.

Figure 6:
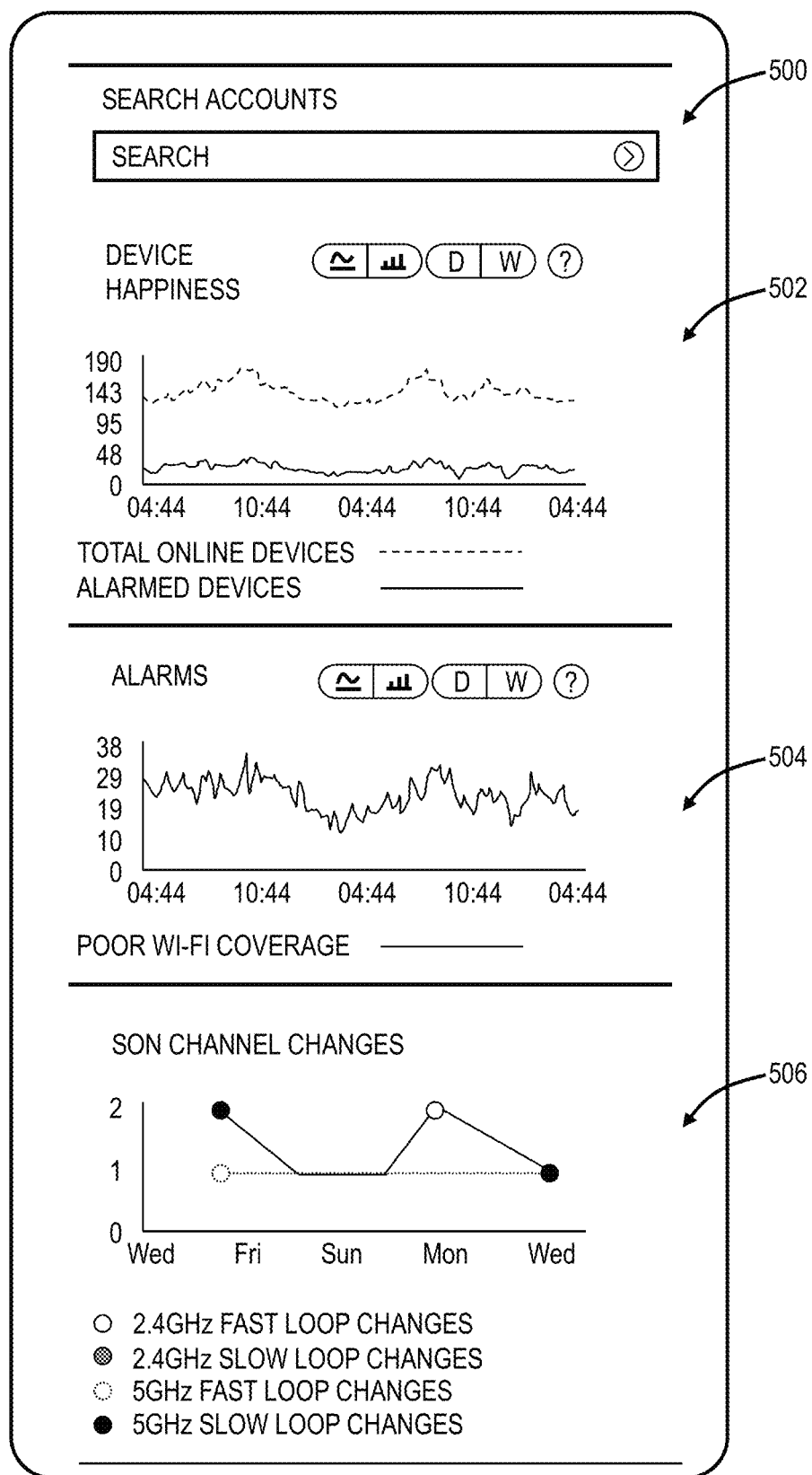
FIGS. 6 and 7 are screenshots of two portions of the dashboard illustrating network-level metrics.
Figure 7:
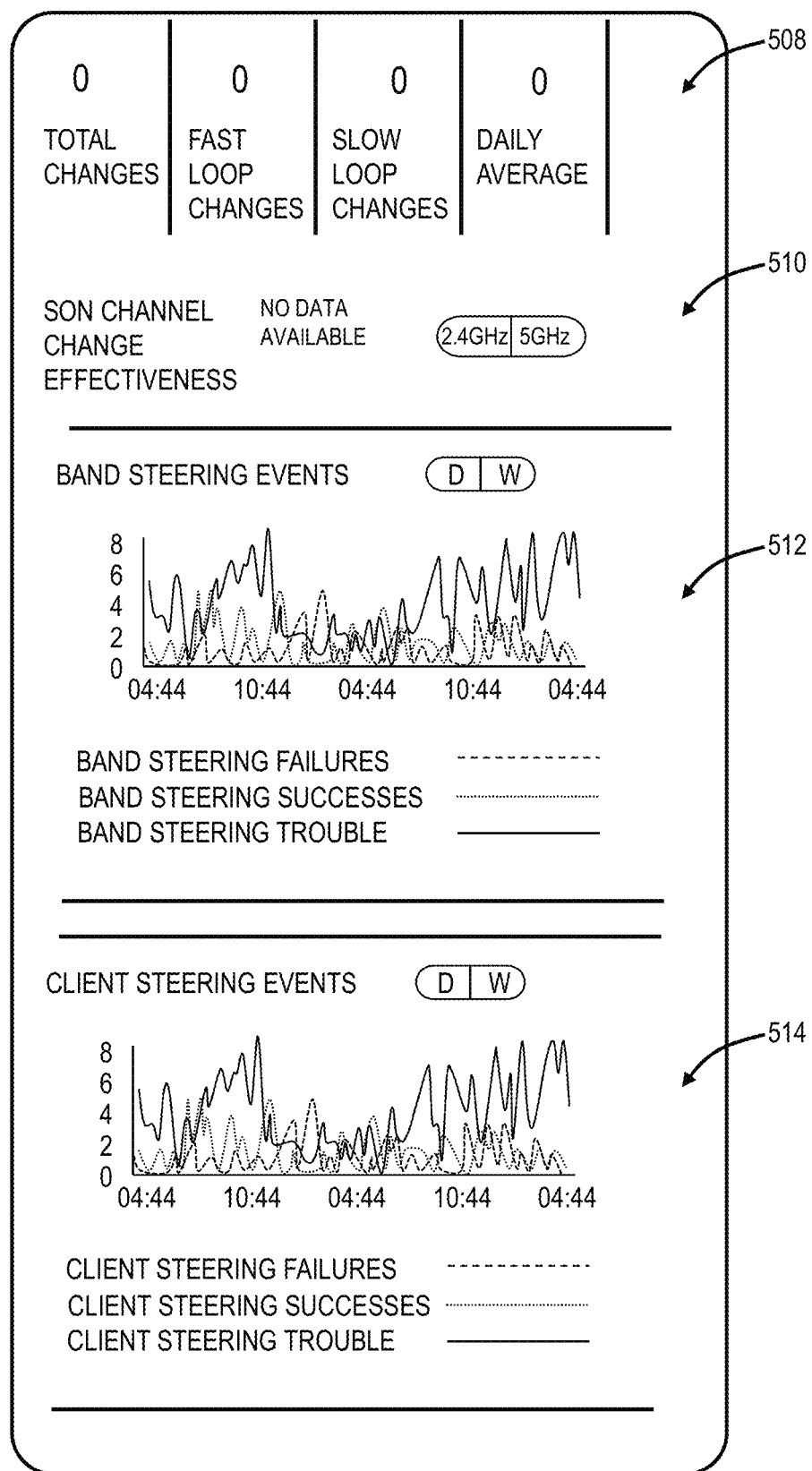

FIGS. 6 and 7 illustrate two portions of the dashboard illustrating network-level metrics. The dashboard can track all devices in various Wi-Fi systems including devices in an alarm state, online devices, offline devices, etc. FIG. 6 includes a search bar 500 where a user can look for a specific account, Wi-Fi system, etc. FIG. 6 further includes a graph 502 of "device happiness" which provides a network-wide view of all Wi-Fi systems being managed by the cloud-based NOC process 400. By device happiness, the graph 502 lists total online devices and alarmed devices over time (which can be adjusted by day, week, etc.). Also, by the device, the cloud-based NOC process 400 is monitoring Wi-Fi system devices, i.e., access points 14, 34, mesh nodes 36, repeaters 38, etc.

FIG. 6 also includes a graph 504 of alarms of all Wi-Fi devices being managed by the cloud-based NOC process 400. For example, the graph 504 shows alarms for poor Wi-Fi coverage. The graph 504 can also show multiple different alarm types (e.g., with different colored lines, etc.) on the same graph.

FIG. 6 also includes a graph 506 of Self-Organizing Network (SON) changes. For example, the distributed Wi-Fi system 10 can be controlled by the cloud 12 including the periodic performance of optimization. An example of cloud-based optimization is described in commonly-assigned U.S. patent application Ser. No. 15/463,321, filed Mar. 20, 2017, and entitled "CLOUD-BASED CONTROL OF A WI-FI NETWORK," the contents of which are incorporated by reference. Other types of control or optimization in the cloud 12 are also contemplated. Here, the graph 506 illustrates 2.4 GHz and 5 GHz fast and slow loop changes.

FIG. 7 can be displayed in conjunction with FIG. 6, such as different tiles in the dashboard. FIG. 7 can include a listing 508 of numbers of network-wide events, such as total changes, fast loop changes, slow loop changes, daily average, etc. FIG. 7 can also include a graph illustrating the SON channel change effectiveness 510. This display can show metrics showing the effectiveness of the cloud-based optimization.

FIG. 7 also includes a graph 512 of band steering events network-wide as an aggregate statistic. The band steering events are a movement of clients between bands (2.4 GHz and 5 GHz). The graph 512 illustrates network-wide statistics for band steering failures, successes, and trouble. Similarly, FIG. 7 also includes a graph 514 of client steering events which are a movement of clients between Wi-Fi devices.

The dashboard can also include a map display showing metrics related to the Wi-Fi systems being managed by the cloud-based NOC process 400. The map can be a geographic map which shows each Wi-Fi system (or groups) and location. A user can navigate the map, select an area, drill-down and select a single Wi-Fi system, or the like to update the other displays in the dashboard.

In an exemplary embodiment, the metrics for the cloud-based NOC process 400 can include Wi-Fi capacity, alarms, channel changes, band steering, channel change effectiveness, health statistics with bins, other parameters in bins, etc. The dashboard can by default display the metrics network-wide with the user being able to search/filter through various commands. Also, the user can define groups of Wi-Fi systems.

Figure 8:
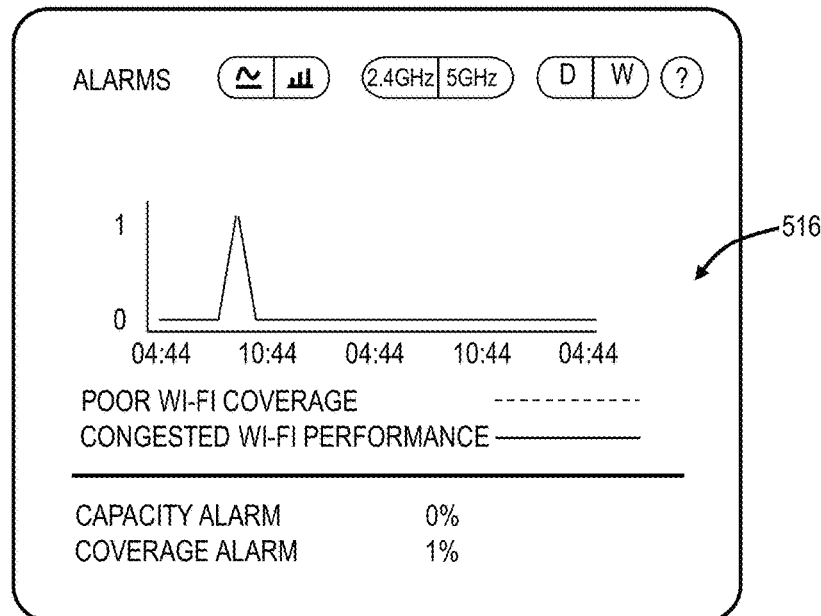
FIG. 8 is a tile in the dashboard illustrating a graph of alarms.

FIG. 8 is a tile in the dashboard illustrating a graph 516 of alarms. The graph 504 illustrates the alarms across all Wi-Fi systems being managed by the cloud-based NOC process 400. The graph 516 illustrates alarms for an individual (or group) of Wi-Fi systems as well as the alarms for a single Wi-Fi device. The graph 516 can be adjusted over time as well as having different lines for individual alarms as well as a line for all alarms in total. This provides a health display in the NOC with counts and percentages listed on the summary page across all of the networks.

The dashboard and/or cloud-based NOC process 400 can raise alarms against devices, networks, groups of devices, groups of networks, accounts, groups of accounts, etc. The alarms can be based on the monitored data and raised when the monitored data exceeds thresholds (which may be configurable). The alarm can have a time constant—how long is it in the bad state, some amount of hysteresis and the alarm may include more different factors simultaneously.

Figure 9:
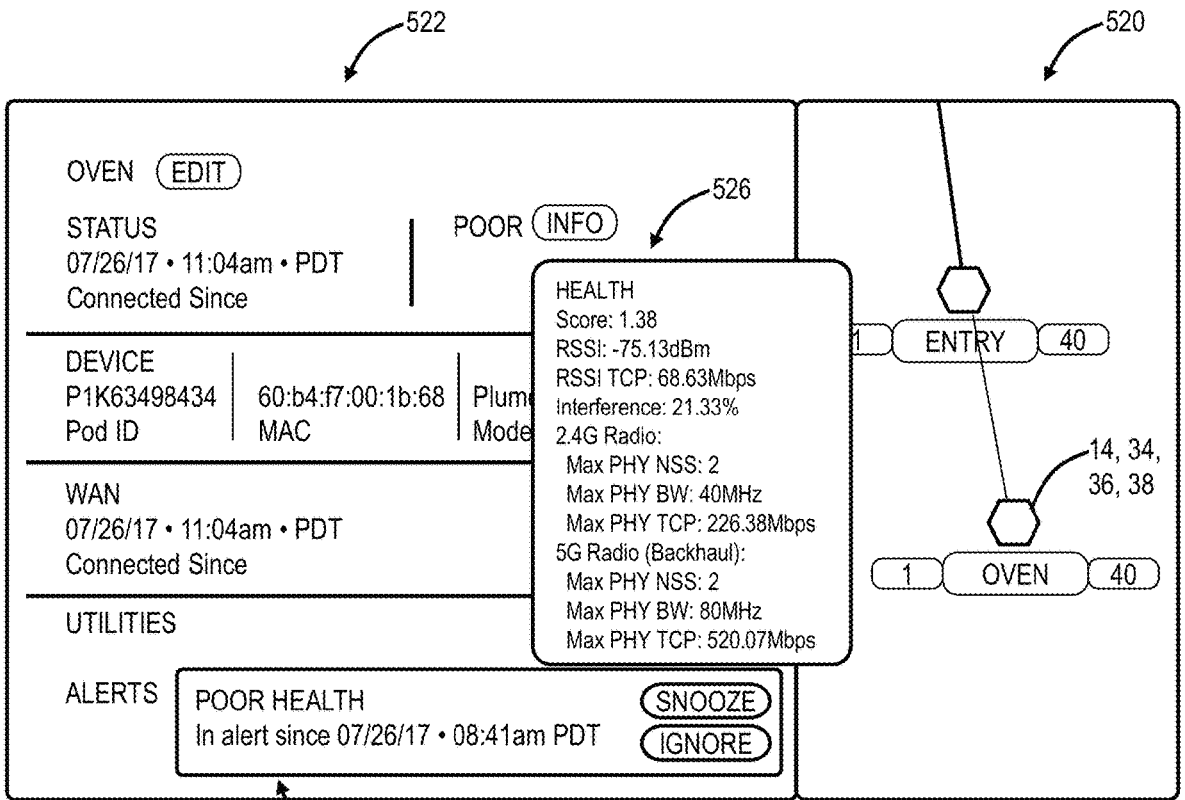
FIG. 9 is a screenshot of an individual device associated with a Wi-Fi network and/or account managed by the cloud-based NOC process.

FIG. 9 is a screenshot of an individual device associated with a Wi-Fi network and/or account managed by the cloud-based NOC process 400. Specifically, FIG. 9 includes a network diagram 520 and a device tile 522. The dashboard can include a GUI for the network diagram 520 which illustrates access points 14, 34, 36, 38 showing connectivity. For example, in the distributed Wi-Fi system 10, lines in the network diagram 520 can illustrate backhaul links (to other access points 14, 34, 36, 38) and client links (to user devices). The network diagram 520 can support zoom, scroll, etc. and click through, select, etc. to bring up details of a device, network, and/or group of networks and/or accounts. Further, the network diagram 520 can include color differentiation on the access points 14, 34, 36, 38, links, etc. For example, in FIG. 9, the access point "OVEN" can be red to indicate poor health and a user can click on the access point "OVEN" to bring up the device tile 522.

The device tile 522 provides status information such as the device name (OVEN, which can be edited), network health (POOR in this example), connection statistics (07/26/17, etc.), device statistics (e.g., ID number, Media Access Control (MAC) address, manufacturer/model, etc. Finally, the device tile 522 can include an alert section 524 which shows an alarm/alert for the poor health and the user can select snooze or ignore.

For the network health, the user can click on an INFO button to bring up a health tile 526 which lists relevant health-related statistics and a score. The network health is a mechanism for a user/administrator to determine the operational status of the access points 14, 34, 36, 38. The score for the network health can be a weighted combination of different factors, such as RSSI, RSSI Transmission Control Protocol (TCP), interference, Number of Spatial Streams (NSS), bandwidth, TCP, etc. The score is meant to provide a meaningful comparison and encompass network operational parameters as well as outside effects such as interference. In this example, the device ("OVEN") uses a 5G channel for backhaul, e.g., on channel 40, to device "ENTRY" and a 2.4G channel for clients. The score here is 1.38 which is indicative of poor health.

Figure 10:
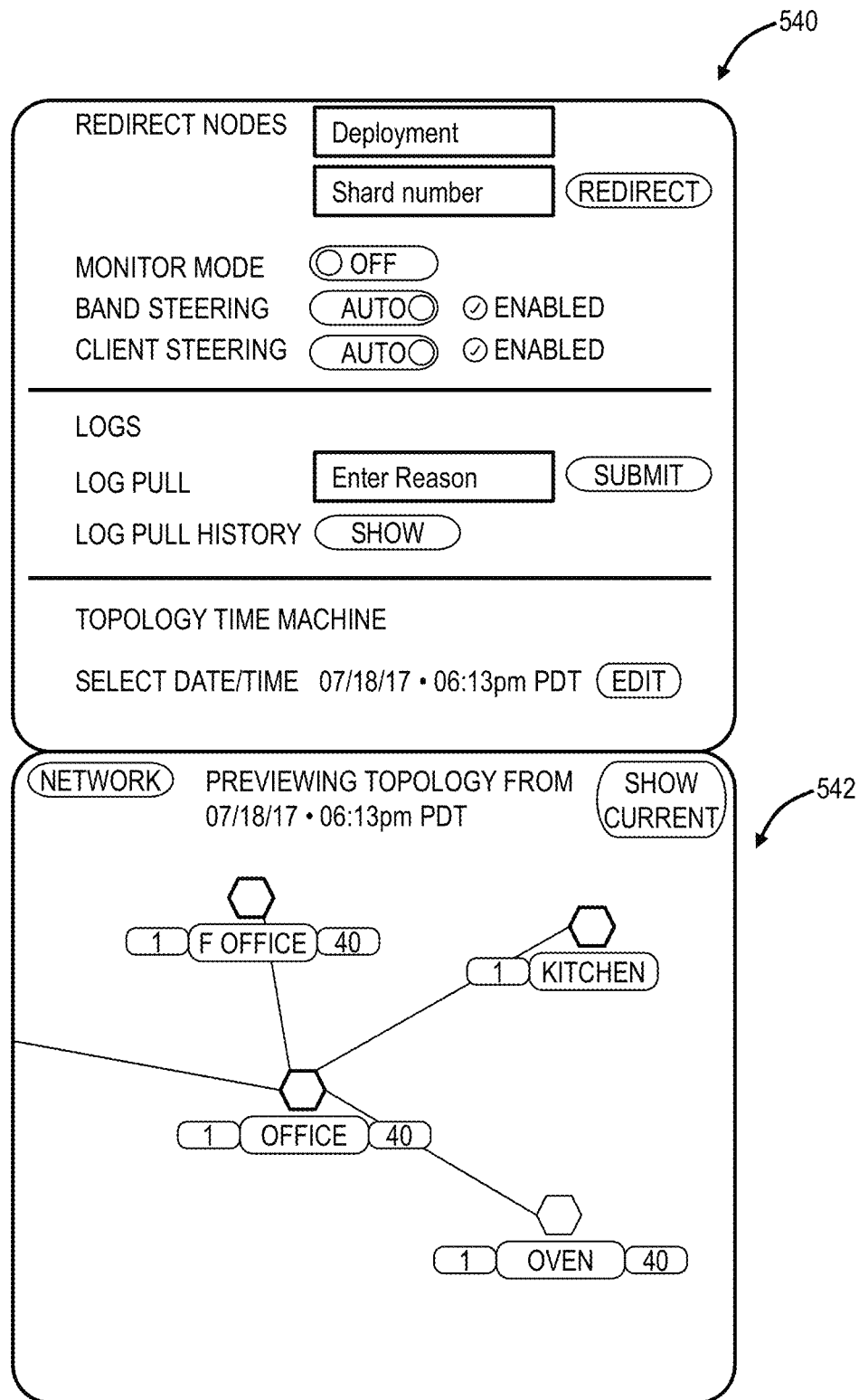
FIG. 10 is a screenshot of a network control tile and a topology time machine time for examining how a Wi-Fi network's topology evolves over time.

FIG. 10 is a screenshot of a network topology tile 540 and a topology time machine tile 542 for examining how a Wi-Fi network's topology evolves over time. As described herein, the distributed Wi-Fi network 10 can change its topology (interconnection of backhaul links, channels, etc.) over time based on periodic optimization. The intent of the topology time machine tile 542 is to configured optimizations, view logs and initiate a visualization of the topology. The optimizations can include forced redirection of nodes, a monitor mode, and configurations for band steering and client steering. Band steering statistics can include kick, failures, success, connects, disconnects, probes that the client device has sent, sticky, reject, etc. The visualization of the topology is presented in the network topology tile 540 which can show the evolution of the network topology over specified times in the topology time machine tile 542. This feature called "Topology time machine" which allows the user to go back to any particular time in the past and see the topology of the network including the connection of client devices to the network.

The topology time machine can also give reasons for the topology changes. Each optimization event which is triggered lists the reason that it is triggered which can include: onboarding of new access points, the manual trigger of optimization, statistics being reported by the access points changed enough to justify an optimization, an access point randomly disconnected or re-connected, etc. The topology time machine can also track channel changes, including ones being done to avoid interference, and track effectiveness of the channel changes both as an overall network aggregated report, and on an individual account basis. For example, the effectiveness of the channel changes can be defined as when a channel change successfully resulted in reduced interference, higher bandwidth, etc.

An operator can use the topology time machine to develop an understanding of best practices in Wi-Fi network deployment, Wi-Fi hardware configuration, etc. This expertise can be used to troubleshoot and optimize networks, build better hardware, etc.

Figure 11:
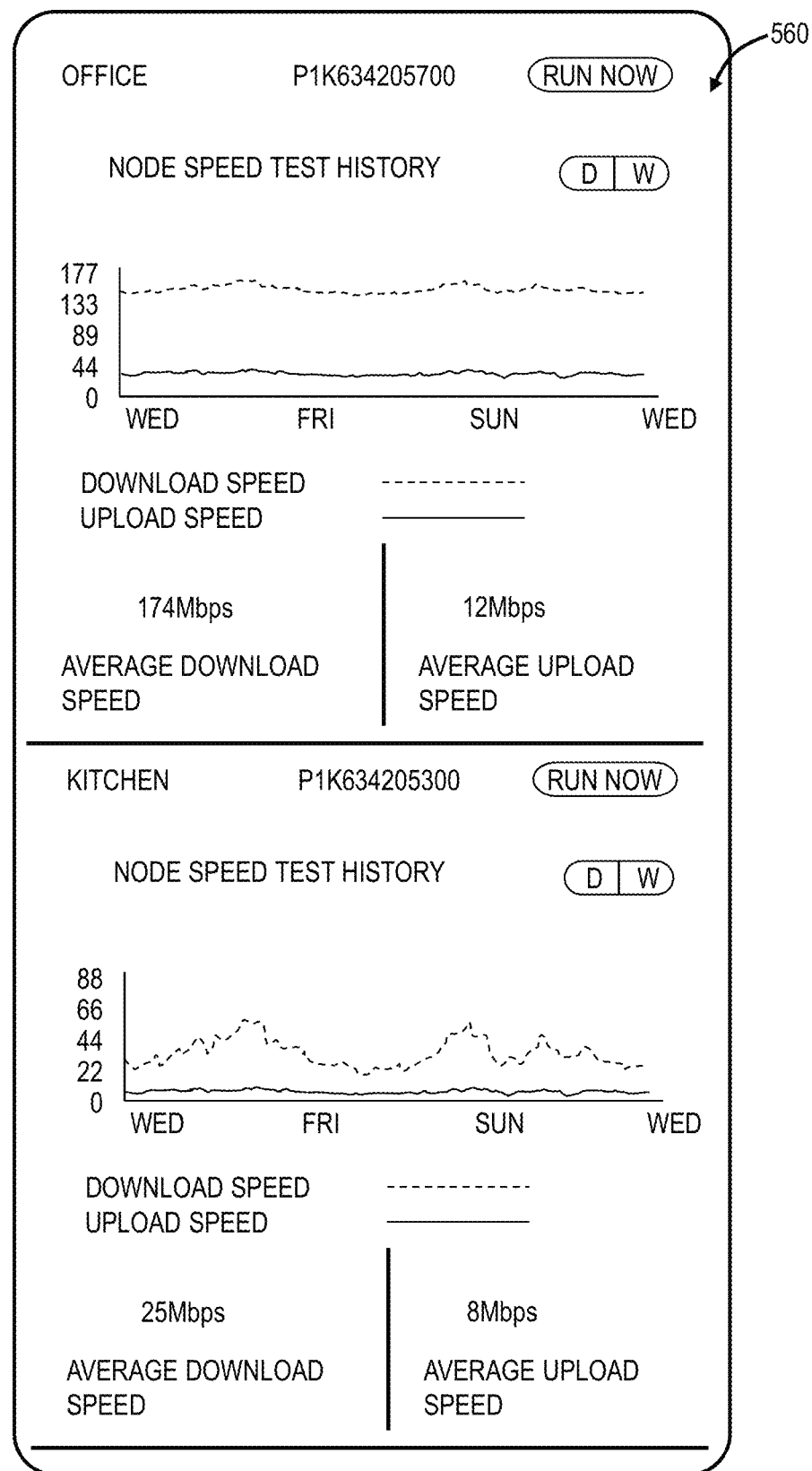
FIG. 11 is a screenshot of network speed test tiles for two nodes.

FIG. 11 is a screenshot of network speed test tiles 560 for two nodes. The cloud-based NOC process 400 can utilize periodically or on-demand speed tests to indicate the performance of a Wi-Fi network. The speed test can be performed as a gateway, at any node in a distributed Wi-Fi network 10, etc. In an exemplary embodiment, the speed test can be controlled from the NOC on demand, such as responsive to trigger conditions, periodic, etc. The speed test shows both download speed and upload speed over time.

In an exemplary embodiment, the NOC/dashboard can correlate the speed test to the topology time machine to alerts/alarms to develop an understanding of speed related to conditions and topology. All of this data can be incorporated into machine learning algorithms to determine correlations to improve network performance and optimization.

Figure 12:
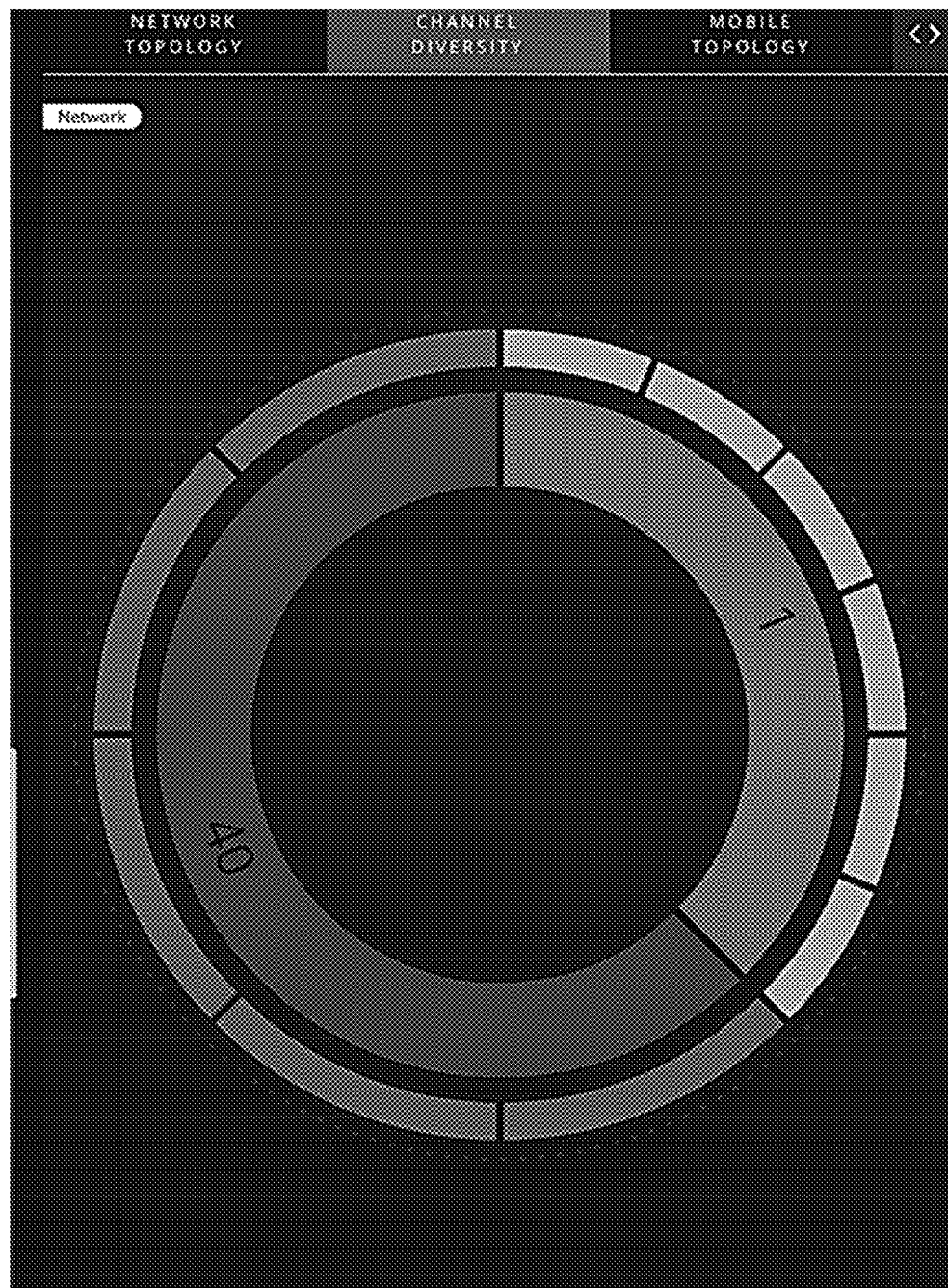
FIG. 12 is a screenshot of a circular graph tile indicating the state of the channel utilization in the Wi-Fi network.

FIG. 12 is a screenshot of a circular graph tile 560 indicating the state of the Wi-Fi network. Specifically, the circular graph tile 560 of channel diversity in an exemplary Wi-Fi network. For example, in this network, two channels are used—channel 40 in 5G and channel 1 in 2.4G. The circular graph illustrates a distribution of channel usage. Other tiles can provide other visualizations related to the state of the Wi-Fi network (as well as groups or all Wi-Fi networks) including health scores (and the definition thereof), channel usage, frequency diversity plot, and the like.

Figure 13:
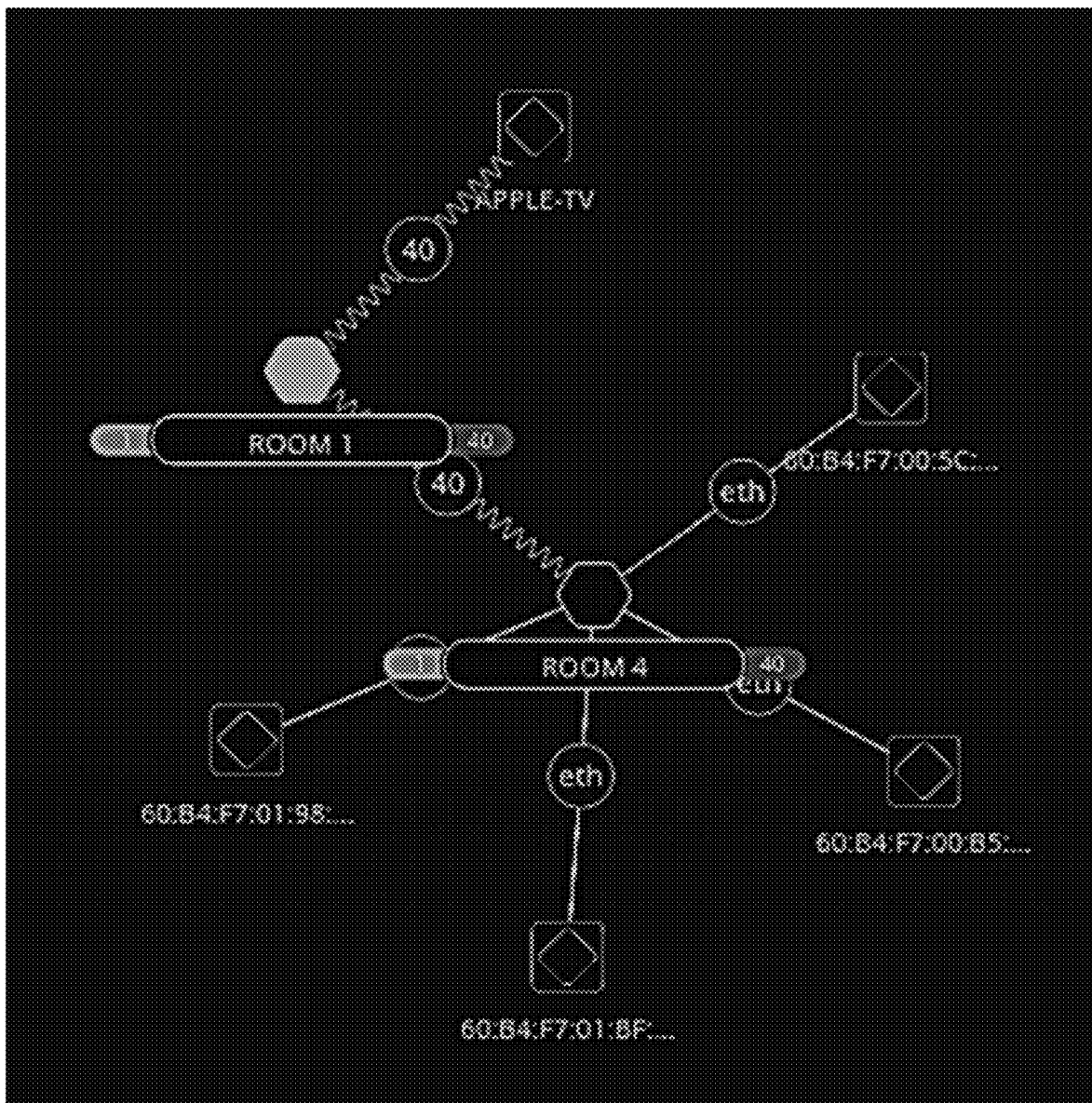
FIGS. 13, 14, and 15 are various screenshots of topology of a Wi-Fi network.
Figure 14:
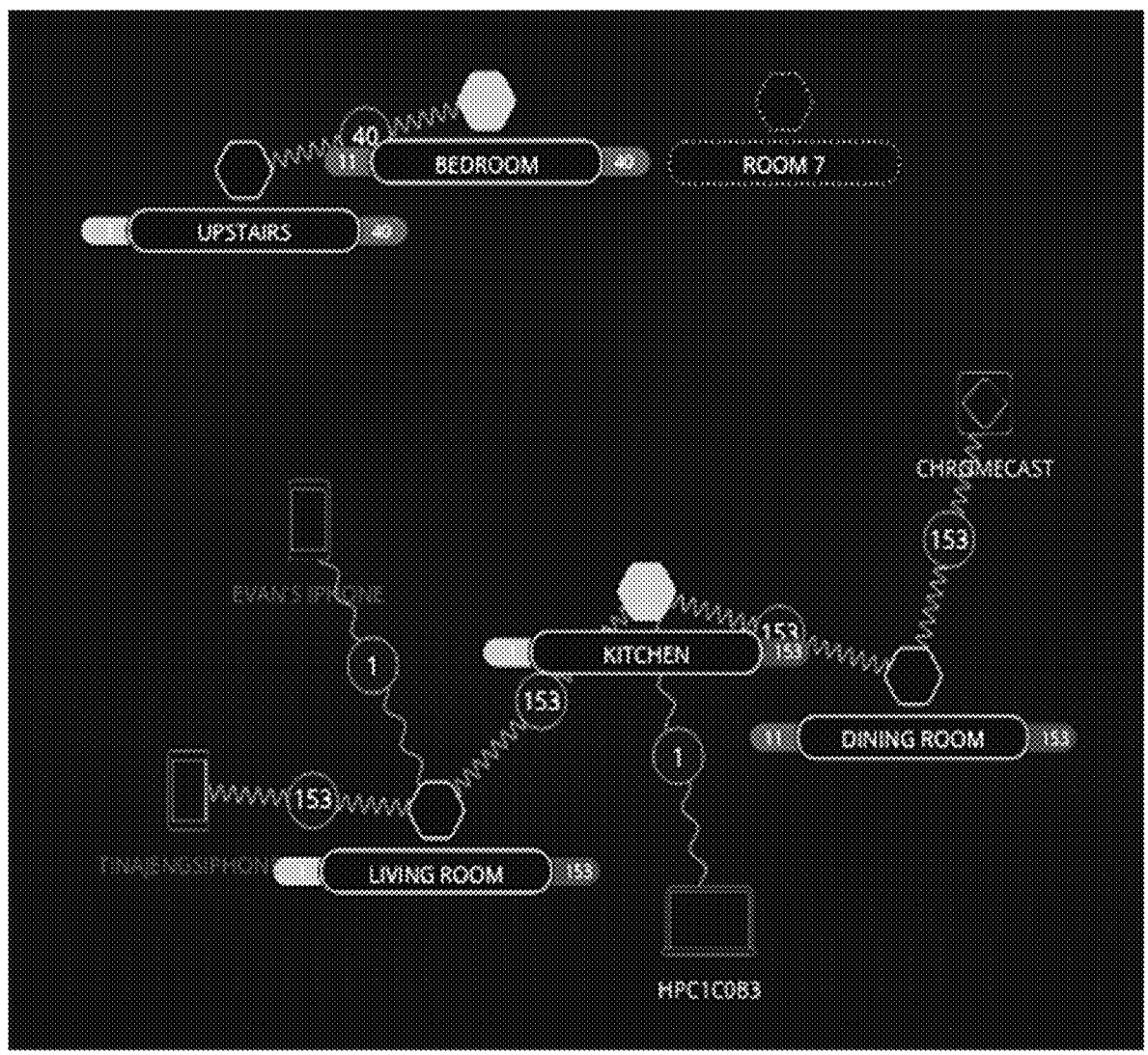
Figure 15:
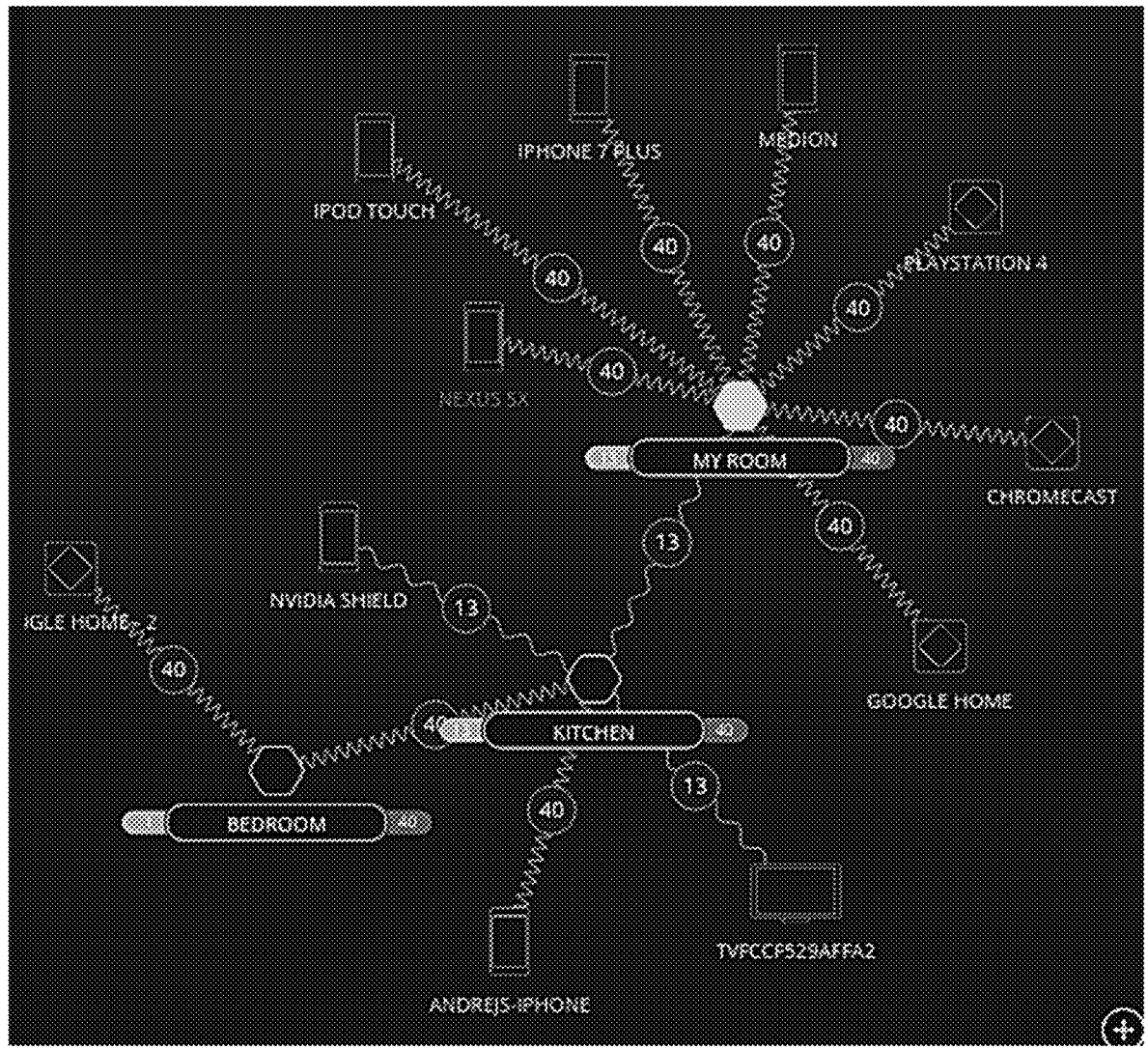

FIGS. 13, 14, and 15 are various screenshots of the topology of a Wi-Fi network. With the topology screenshot and the dashboard, a user can view the Internet Protocol (IP) addresses of any device, MAC address, software version and history of software upgrades, connected clients and their associated information (name, device type, IP address, MAC address, etc.), graphs of data consumed (by access point or node), physical layer data rates and speeds on individual links, etc. Further, this information is available anywhere in any network through navigation (click, scroll, etc.).

Of note, wireless links and access points are not quite one to one, as a given access point may have multiple wireless links, for example to the parent access point, the child access point, or to a client. The tabs have items related to both the access points and wireless links separately in general, and each could be characterized by a health score in general).

Figure 49:
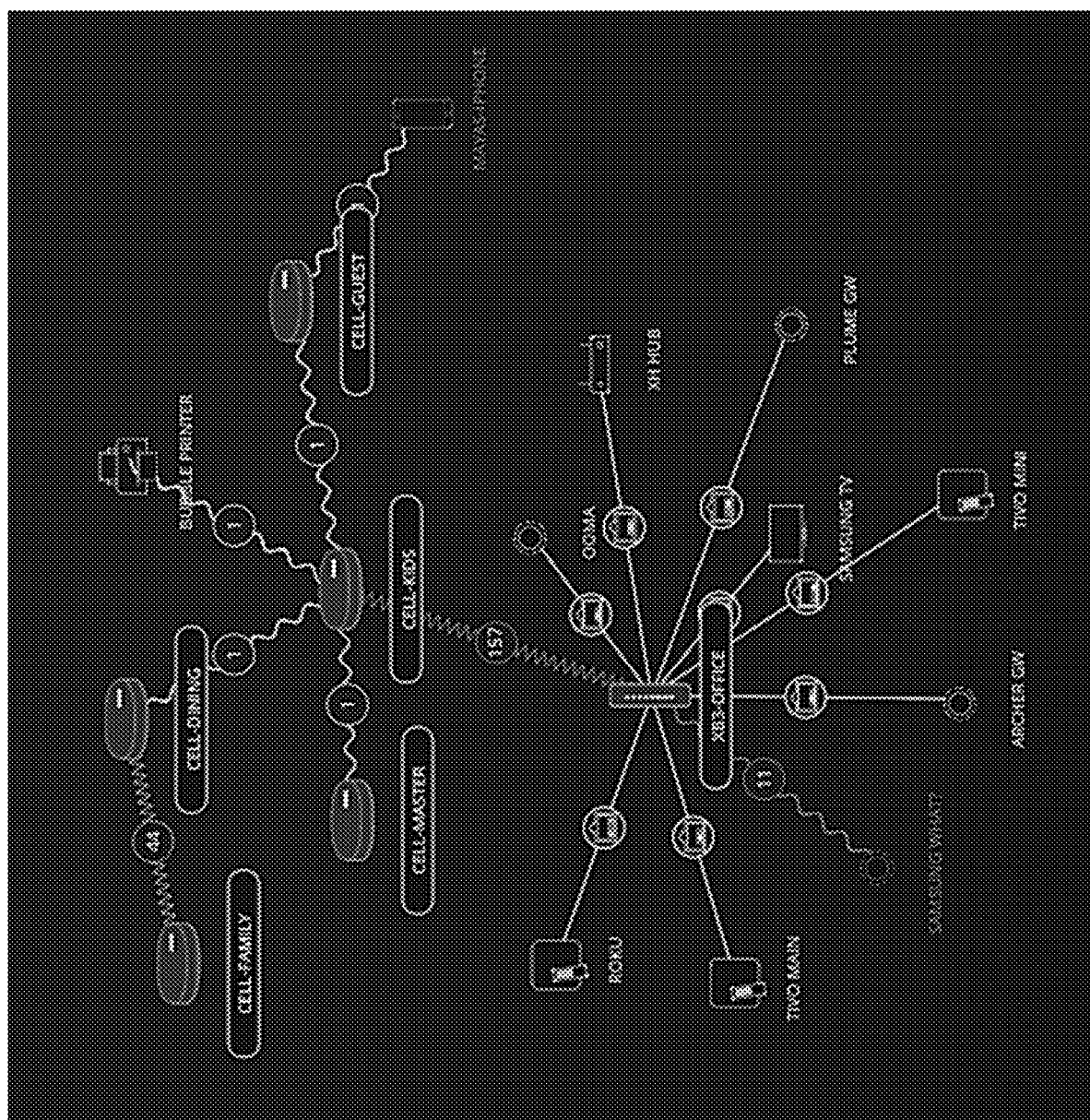
FIG. 49 is a screenshot of a topology display in which the icons used are representative of the actual physical devices in the network.

FIG. 49 is a screenshot of a topology display in which the icons used for various devices are representative of the physical devices in the network. The following examples can be seen in this figure: Roku media streaming device, Apple TV media streaming device, Samsung TV, Samsung Cell AP device, Apple iPhone device, Comcast XB3 gateway device, HP Inkjet printer, and a Xfinity Home Hub IoT home automation gateway. Many other devices are treated similarly and also contemplated. This is accomplished by typing the device which is connected to the network, and matching that type to an icon. Device typing can be done using any combination of techniques known in the art, including MAC address Organizationally Unique Identifier (OUI), DHCP fingerprinting, web browser user agent identification, and other methods.

In an exemplary embodiment, the dashboard can include a master map showing all Wi-Fi networks under control of the cloud-based NOC process 400. The user can click on an individual network or enter a network identifier to bring up that network. For example, the network identifier can be tied to an account name. For example, each user's Wi-Fi network can be associated with an account (user ID, password, etc.) in the cloud-based NOC process 400.

The topology views provide a combined view of wired Ethernet and wireless links in Wi-Fi networks, connected clients, and the like. In particular, the topology views graphically illustrate connections between devices and whether they are on 2.4G or 5G, and what frequency channel they are on. Also, channels that are available for clients to connect can be shown.

The topology views can include different icons to convey different device types, e.g., access points, repeaters, laptops, desktops, tablets, mobile phones, media players, Internet of Things (IOT) devices, etc. Offline devices such as access points can be grayed, dimmed, and/or shown with dotted lines. The access point serving as the gateway can be shown differently, such as shaded as in FIGS. 13, 14, and 15. Also, multiple gateways can be shown wired to the Internet.

The access points' icons can also be color-coded to indicate health as described herein, e.g., green, yellow, red, etc. The color coding can be used to indicate throughput capability, interference, a calculated overall health metric, etc. Various items in the topology views can be clickable to bring up additional information related to the device, link, client, etc. The topology views can also present indicators related to the topology including channels, band, RSSI, local access channel, health status, alarm, off-line access points, bandwidth, channel capacity, channel gains, channel width, type of connection (e.g., Wi-Fi vs. Bluetooth vs. Zigbee).

The topology views can also automatically update in real-time based on optimizations, topology changes, etc. Further, the user has the ability to change the topology views with various options/preferences on what/how much information is shown).

FIG. 16 is a screenshot of a tile for a performed optimization. With the topology time machine, logs, etc., a history of optimizations can be maintained including inputs and outputs of each optimization, the reason that the optimization occurred, the amount the optimization was able to improve performance from what came before, time/date of optimization, how long the optimization took to complete, whether the optimization was deployed successfully or not. Also, the dashboard can provide the ability to see the topology graphically at the beginning of each optimization and the topology that was the output of each optimization.

Figure 44:
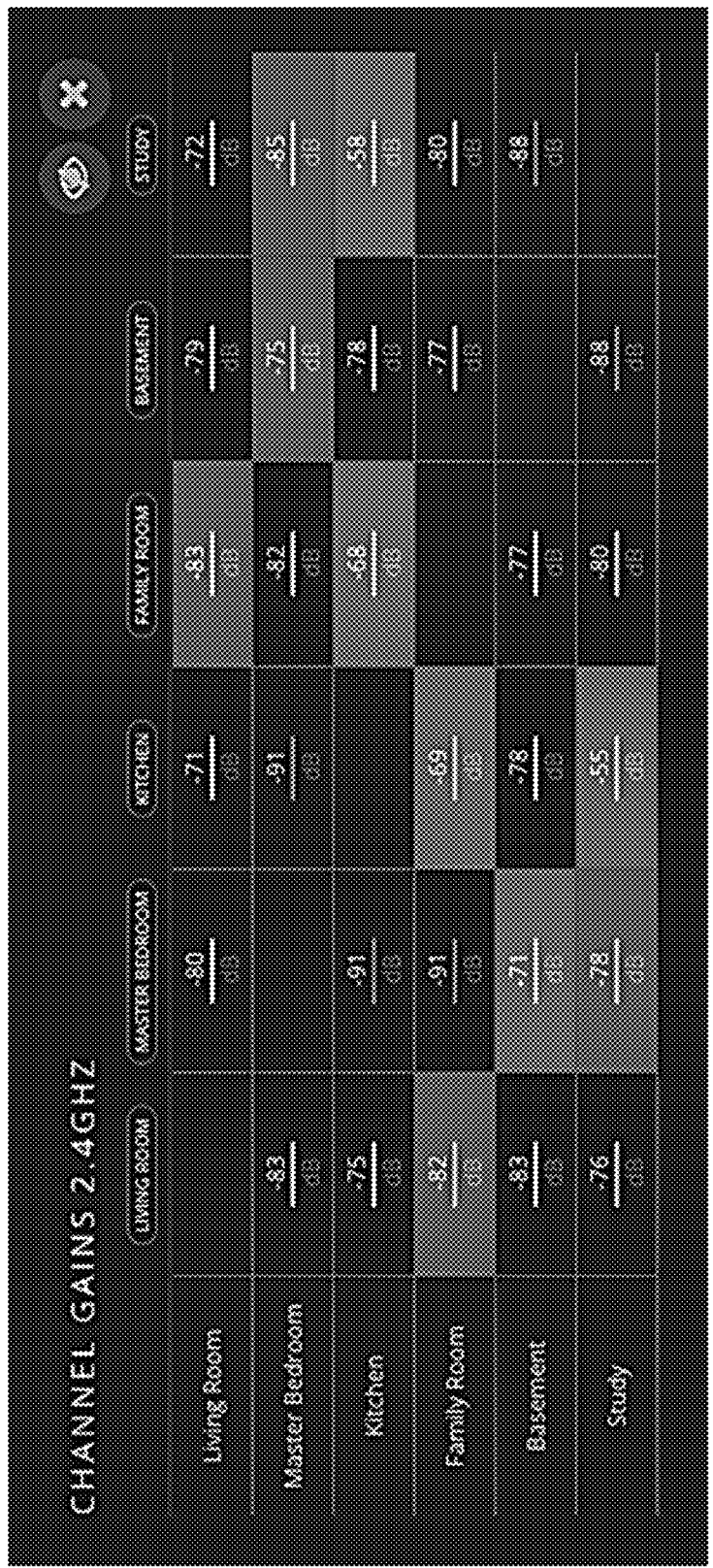
FIG. 44 is a screenshot of a table of a matrix illustrating the channel gains (signal strengths) between all access points in a network (home)

The inputs and outputs to each optimization can be accessed in the NOC by clicking on the rectangular tabs shown across the bottom of the screenshot in FIG. 16. The first two rectangles link to tables that show the channel gain, or signal strength, between each of the access points. FIG. 44 illustrates a screenshot of such a chart. It is arranged as a matrix. Both the uplink and downlink (Tx and Rx) direction for each link is indicated in the table, making for a full matrix. Along with indicating the signal strength or channel gain as an absolute number, the chart can be color coded using thresholds to indicate which links have strong signal, and which are weak. In this example red, yellow, and green coloring is used to indicate strong, medium, and weak signal strengths for each of the links, any of which might be used to form a topology for the network. Finally, it is possible to highlight on the chart, through circling, or shading, which of the links were actually selected for use by the optimizer in the final topology. A table similar to this can be created for all possible links in the 5 GHz band, or any other additional bands or potential means of connecting the pods, including wired Ethernet, powerline, or cable connections.

FIG. 45 illustrates the screenshot of a table that summarizes the interference levels at each of the access points on each frequency channel that were used as input to the optimization. Similar coloring and shading schemes can be used to highlight acceptable/unacceptable levels of interference. This table can be called up using the INTERFERENCE rectangle at the bottom of the optimizer screen (FIG. 16).

FIG. 46 illustrates a screenshot of a table that represents an output of the optimization. Once the optimizer has chosen a topology, it is possible to estimate the throughput performance that a client would achieve were it to connect to the given AP on the given frequency band or channel. This provides the user of the NOC with an immediate indication of the expected level of performance at each location in the home which can be accessed through the PERF PREDICT button.

Figure 47:
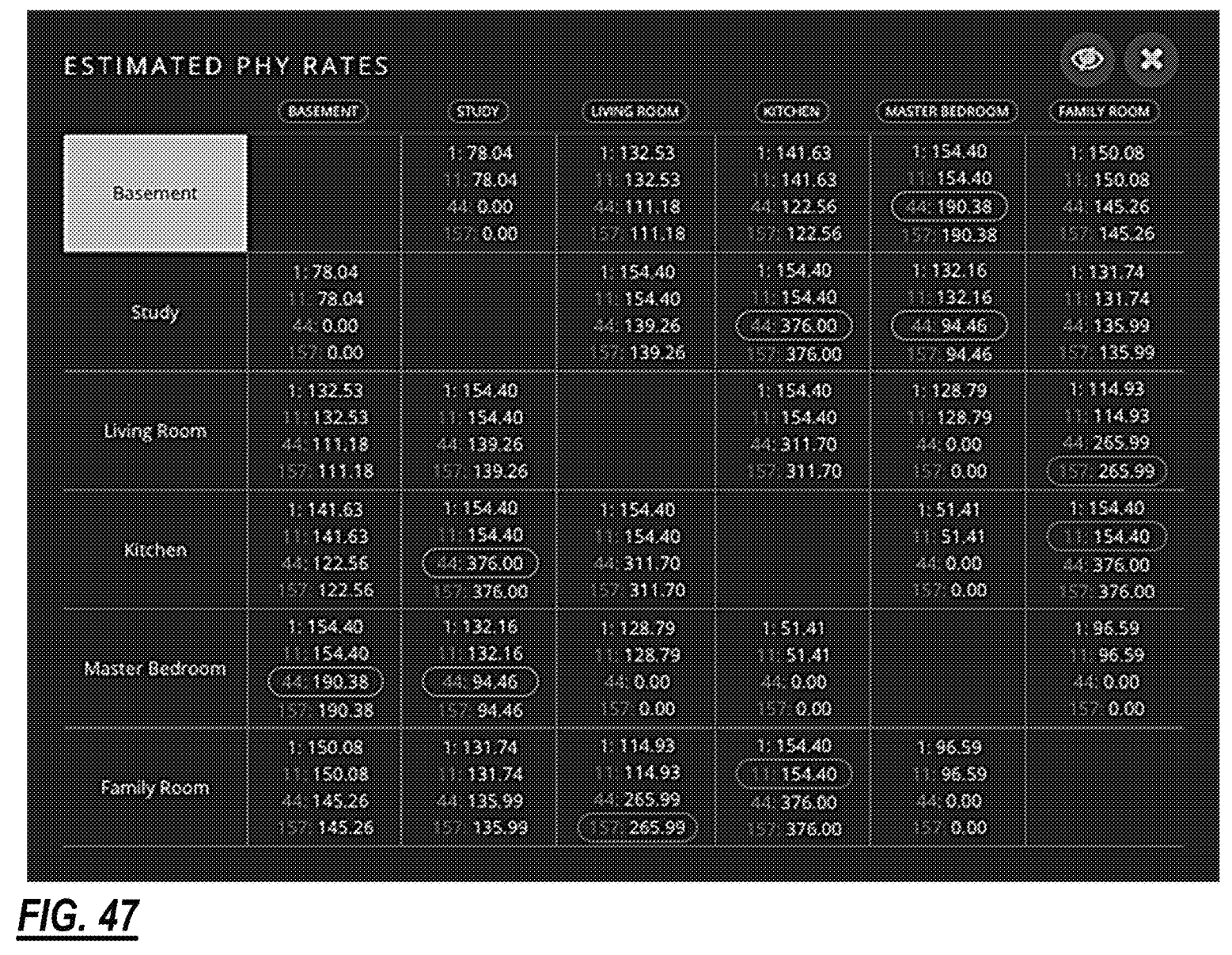

FIG. 47 illustrates a screenshot of a table similar to the gain table, but in this case indicating the estimated PHY data rate that could be achieved between any two access points. In this table, these rates are specific to the frequency channel used to connect the two access points. Coloring schemes can be used to highlight links with good or bad performance. Links that are actually chosen for use by the optimizer can be circled. All tables regarding throughputs, whether estimated, measured, or predicted, can be PHY layer data rates, MAC layer throughputs, or IP (TCP or UDP) throughputs.

Figure 48:
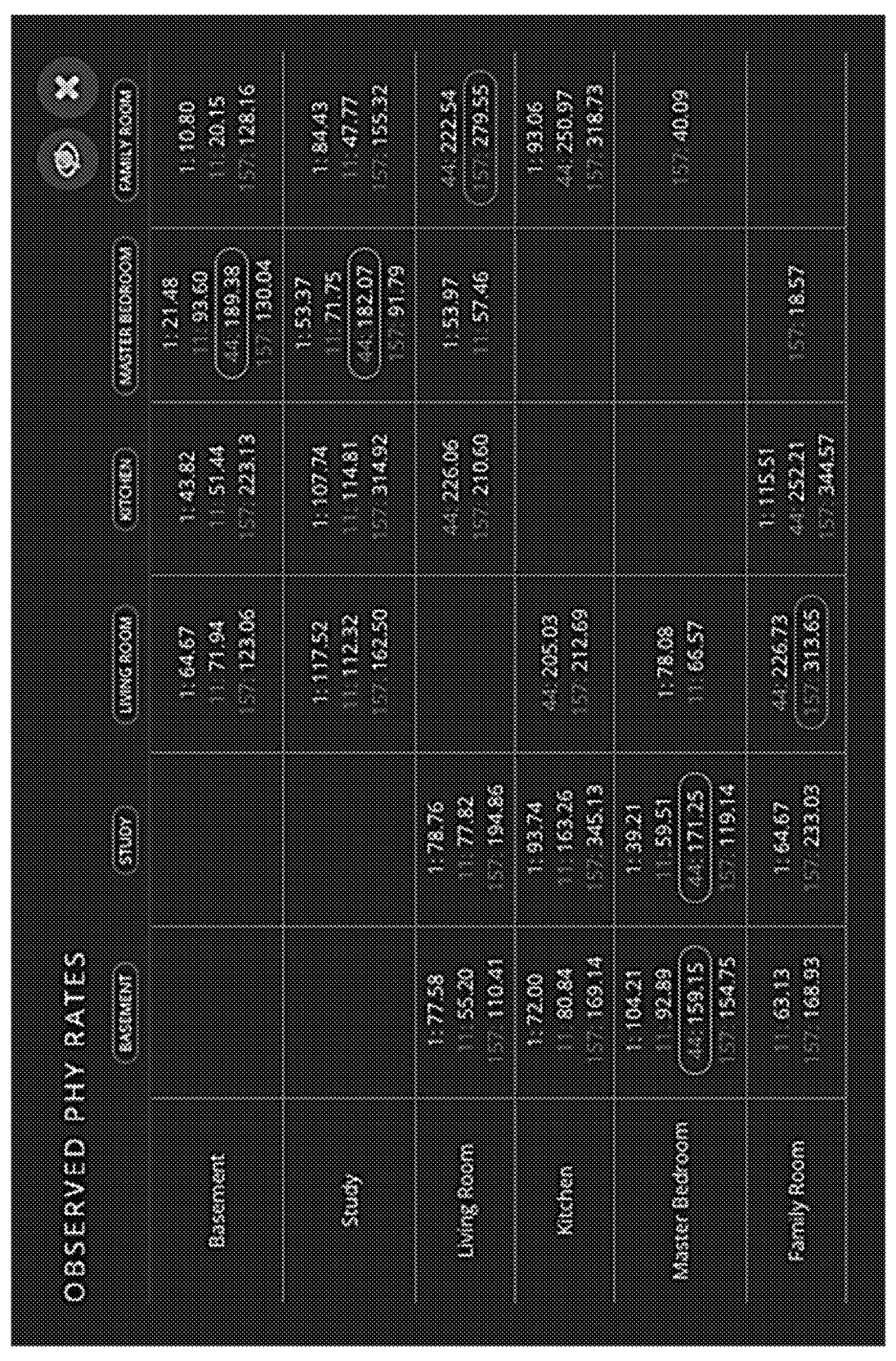

FIG. 48 illustrates a screenshot of a table similar to the estimated PHY data rate table, but in this case based on actual measurements of the performance of the link in real life. Again, coloring and circling can indicate performance levels and links actually selected by the optimizer. Note that any of the tables described may be incomplete if data is missing. Data may be missing because a link has never been used, or because off-channel scanning is not enabled for that channel.

NOC Dashboard

In an exemplary embodiment, information displayed in an NOC dashboard can include the following tabs account, network, advanced settings, optimizer, speed test, links, access point devices, client devices, etc. The Account tab displays basic profiling information relevant to a user. As described herein, a user is an owner of a Wi-Fi network under management by the NOC dashboard and the cloud-based NOC process 400. In the account tab, the username, email, application Operating System (OS) and version, location, creation date, etc. can be available. Following e-mail validation and onboarding, the access point devices seen by an onboarding process are visible. As described herein, onboarding is the process of bringing a Wi-Fi network under control of the NOC dashboard and the cloud-based NOC process 400. The onboarding can use a mobile device, application, and wireless protocol such as Bluetooth. The account tab enables the administrator to delete an account, assign a group to the account, modify the username and/or SSID, resend e-mail verification, etc.

The network tab displays details of current and historical structural Wi-Fi configurations. The current network state can be mapped in the network topology, channel diversity, and mobile topology. In order to view historical network states, the topology time machine can be used. The network tab can assist administrators in troubleshooting. In order to troubleshoot with system logs, a log pull can be submitted and accessed through the created link. In addition, the administrator can re-configure the network. This involves rebooting a location, claim/unclaiming an access point device, modifying the SSID, PSK (Password), and the band steering state.

The advanced settings tab displays current systemic Wi-Fi configurations. The advanced settings tab can also assist the administrator in troubleshooting. The administrator can use the tab to modify the network mode, Universal Plug and Play (UPnP), Domain Name System (DNS) Servers, Dynamic Host Configuration Protocol (DHCP) reservations, bridge versus router mode, and port forwarding settings.

The optimizer tab displays logs of optimization jobs performed for the location. Tapping on the different headers can provide insight on the KPI triggers and purpose of the job. The optimizer tab can enable the administrator to push manual optimization triggers, and toggle the auto-optimization on/off. The speed test can trigger remote speed tests at individual access point devices and automated Internet Service Provider (ISP) speed tests on the system. In addition, it will allow the administrator to toggle Automated ISP Speed Test on/off, along with providing a dashboard to view results.

The links tab provides a focus on the client links and the backhaul links. The tab can provide sorted information on the medium, band, and channel attributes of the links. The access point devices tab provides an overview of the location from the perspective of the access point devices. Sorted information on the number of devices connected, firmware versions, MAC, IP and connection date details can all be visible upon clicking show details. The access point devices tab assists the administrator in troubleshooting as well. Clicking on any access point will bring up controls that enable setting a Light Emitting Diode (LED) Mode to locate, rebooting an access point, or running speed tests on the access points. After results are updated to the cloud, the speed tests on the access points will move to the Speed Test tab mentioned above. The client devices tab provides an overview of the location from the perspective of devices. Clicking on any device will provide in-depth information such as connection type, IP and MAC addresses, RSSI values, bandwidth usage values over different periods of time.

Onboarding Using the NOC Dashboard

Figure 17:
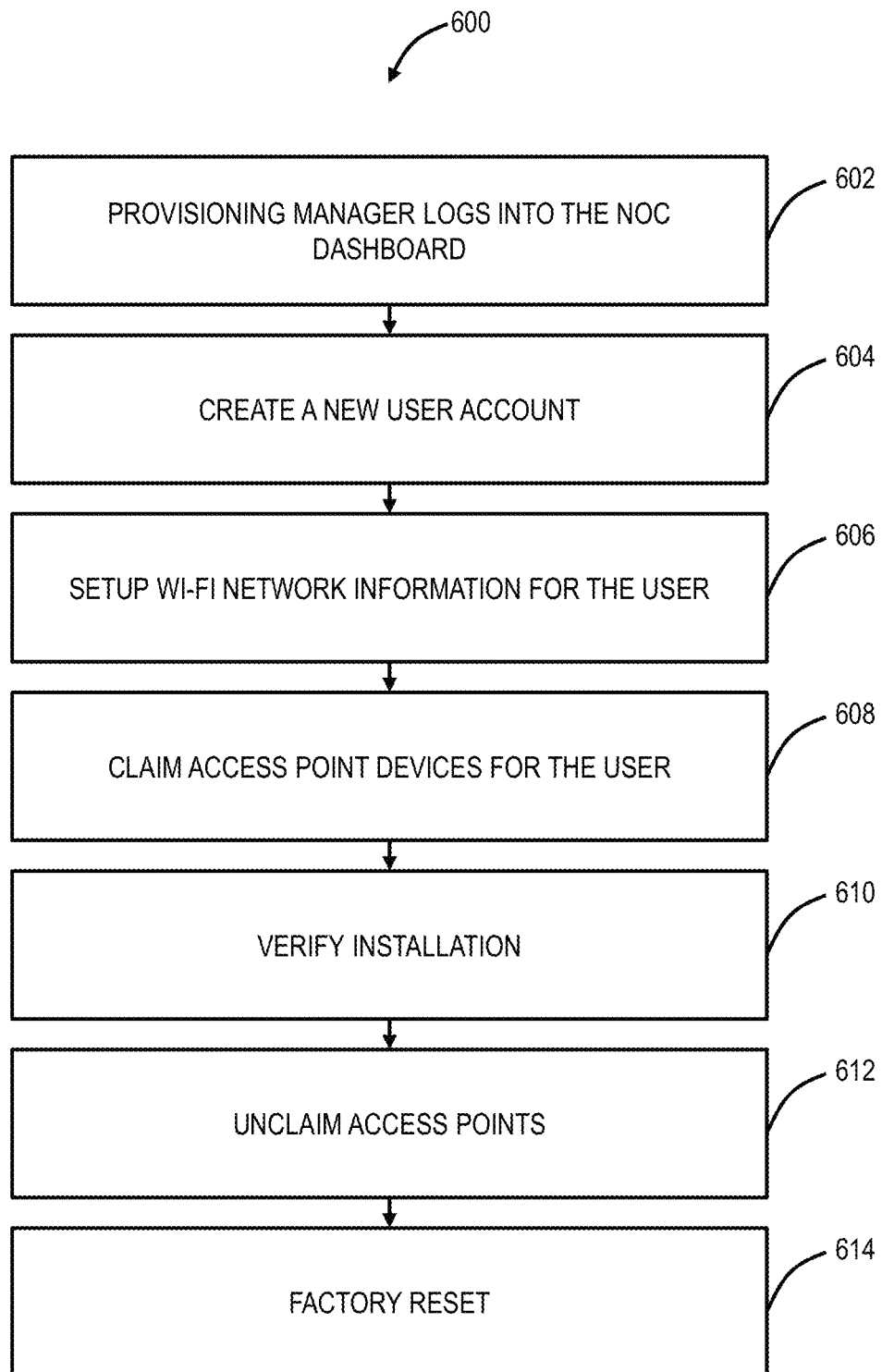
FIG. 17 is a flowchart illustrates an onboarding method using the NOC dashboard.
Figure 18:
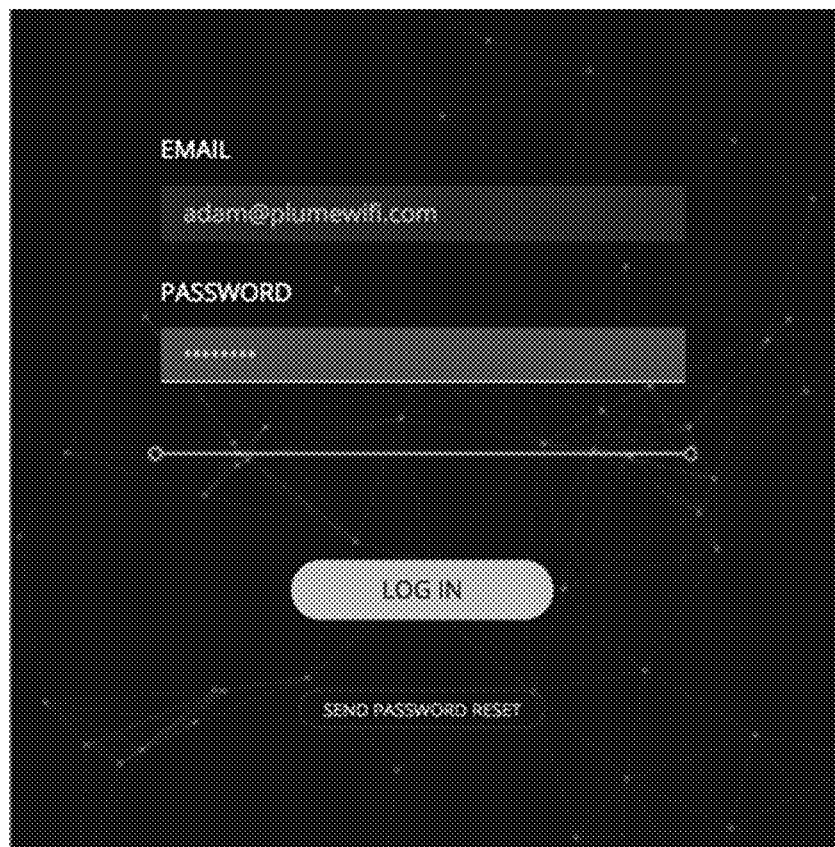
FIG. 18 is a screenshot of a login screen for the NOC dashboard.
Figure 19:
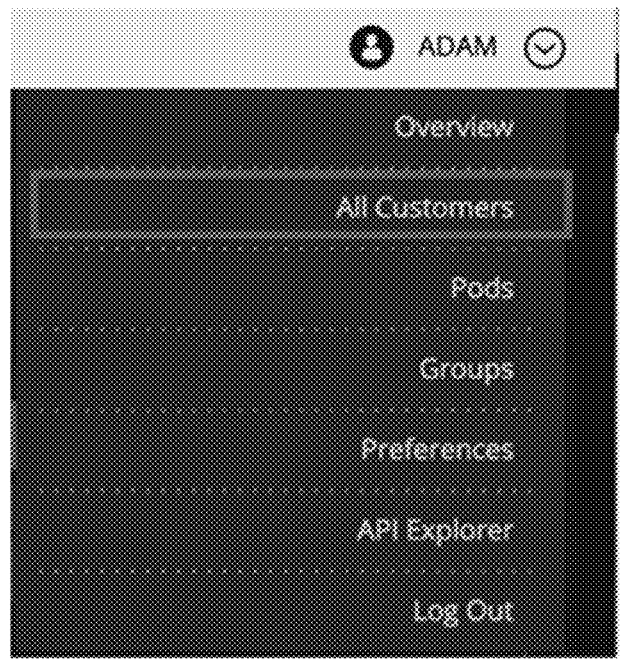
FIG. 19 is a screenshot of a pulldown menu in the NOC dashboard.

Referring to FIG. 17, in an exemplary embodiment, a flowchart illustrates an onboarding method 600 using the NOC dashboard. The NOC dashboard can be used by an administrator to assist end users in deploying their Wi-Fi network. The onboarding method 600 includes a provisioning manager logging into the NOC dashboard (step 602). FIG. 18 is a screenshot of a login screen for the NOC dashboard. Next, a new user account is created (step 604). For a new user, a new account may need to be created through the NOC dashboard without using an app, i.e., without the user themselves creating the account. From any screen click the pulldown menu next to the login name at the top right corner of the screen, as shown in FIG. 19. Subsequent to selecting All Customers in FIG. 19, the window in FIG. 20 appears which is a listing of all customers. To add a new customer, click on the Add New Customer button in FIG. 20 to bring up the fields shown in FIG. 21.

Figures 20, 21:
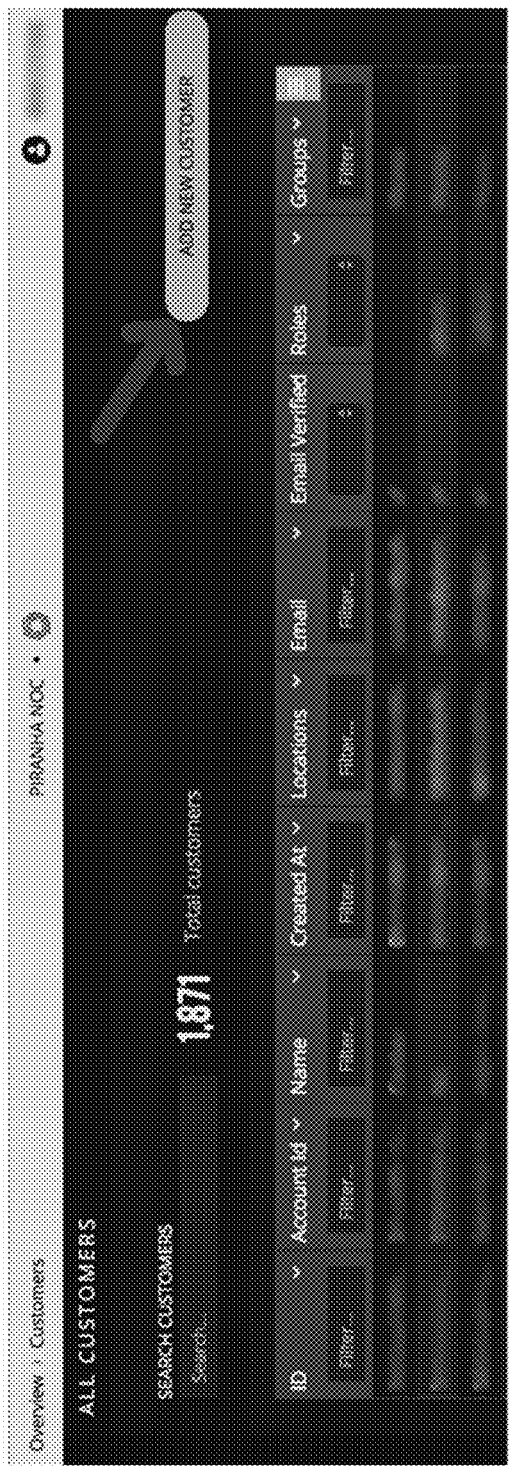
FIG. 20 is a screenshot of a listing of all customers in the NOC dashboard.
FIG. 21 is a screenshot of fields for adding a new customer in the NOC dashboard.
Figure 22:
FIG. 22 is a screenshot of an account tab after email verification of a new customer account.

In the space provided in FIG. 21, an email address and a password can be added. Now, this account can be searched for by typing either the name or the email address in the Search Customers field in FIG. 21. FIG. 22 is a screenshot of an account tab after email verification of a new customer account.

Figure 23:
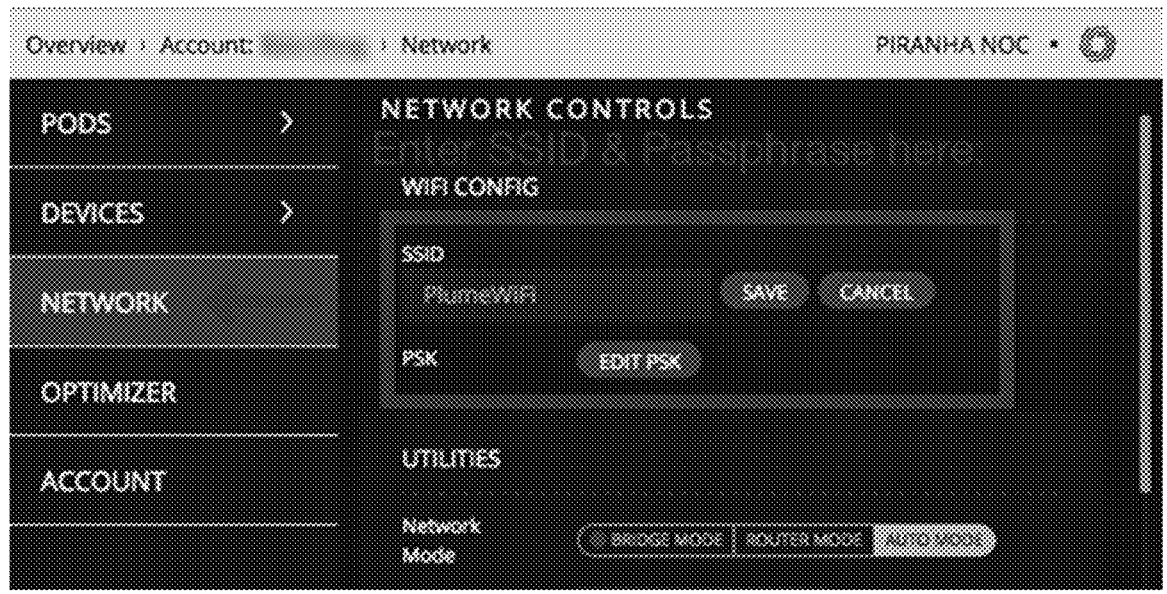
FIG. 23 is a screenshot of the network controls to add/edit the SSID and passphrase.

Next, the Wi-Fi network information (SSID and passphrase) can be set for the user (step 606). FIG. 23 is a screenshot of the network controls to add/edit the SSID and passphrase. The SSID and passphrase will be automatically synchronized across all access point devices joining the network. Next, the access point devices are claimed for the user (step 608). Again, as described herein, the access point devices can include any of the access points 14, 34, 36, 38. The process of claiming associates the access points to the user.

The claiming process can include entering access point serial numbers, receiving data from a mobile application which locally claims the access point devices, associating the serial numbers to a user in the factory or at the point of sale, through the installation of software on the access points, through software pre-installed on the access points, etc. That is, the cloud-based NOC process 400 contemplates any technique to identify the access points to the NOC dashboard uniquely.

Figure 24:
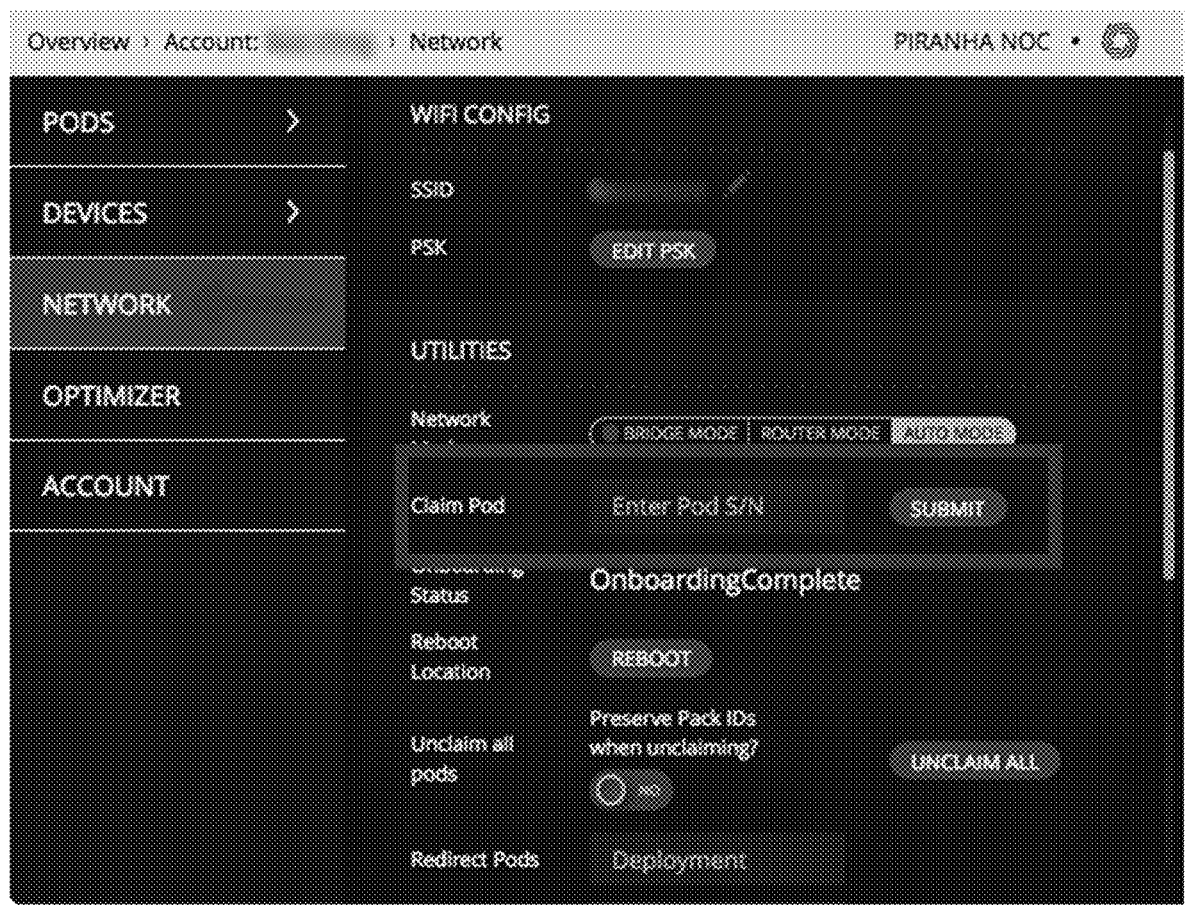
FIG. 24 is a screenshot of claiming access points by entering serial numbers in the NOC dashboard.

In an exemplary embodiment, the claiming is performed by providing the serial numbers of each access point in the NOC dashboard. FIG. 24 is a screenshot of claiming access points by entering serial numbers in the NOC dashboard. The process can be completed to claim multiple access points for a user. Since multiple access points are typically deployed for each distributed Wi-Fi system 10, with proper logistics support, it is also possible to pre-bundle multiple access points into "packs" such that entering the serial number of one access point from a pack allows the entire pack of access points to be claimed automatically. For example, if a pre-bundled pack of six access points was to be installed for a user, the technician need only enter one serial number, and the entire pack of six access points will be automatically claimed for the user. Soon after the serial number is entered, an icon representing the access points will appear on the network window on the right (Number of icons should match the number of access points claimed one at a time or as a pack). Note an "OnBoardingComplete" button is recommended to select after the access points are claimed for this account. This is the way to inform the NOC dashboard that there are already access points claimed to this account, and at login, the app for the user will see the home screen instead of onboarding screen.

Figure 25:
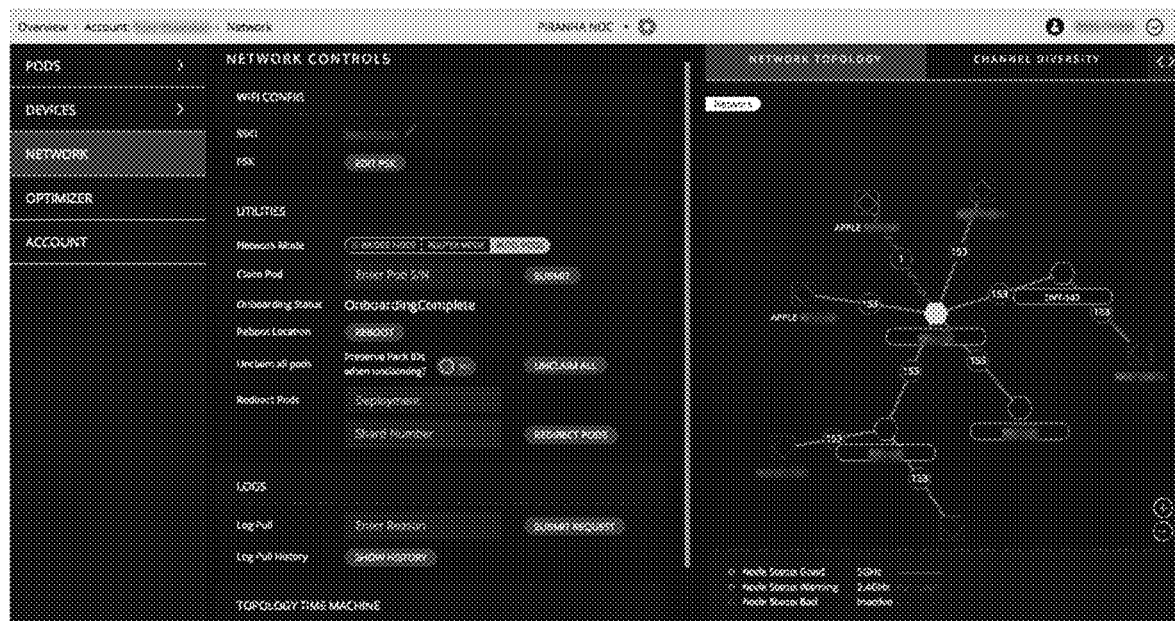
FIG. 25 is a screenshot of a network topology subsequent to claiming access points.

Next, the installation is verified (step 610). Within minutes of plugging in the access points, the NOC dashboard shows that the access points are online (the icon can change from Red to Green). Note that under "Network Topology" in FIG. 25, one solid hexagon and three empty green hexagons are shown. Each hexagon represents an access point. The color green can signify that the access point is online and functioning correctly. The solid green hexagon represents the gateway access point, i.e., the one that is connected using Ethernet backhaul (note multiple access points can be connected to the gateway). Should there be access points that have been claimed for the user but are not online, such access points will be represented as red hexagons in the NOC's topology view.

Figure 26:
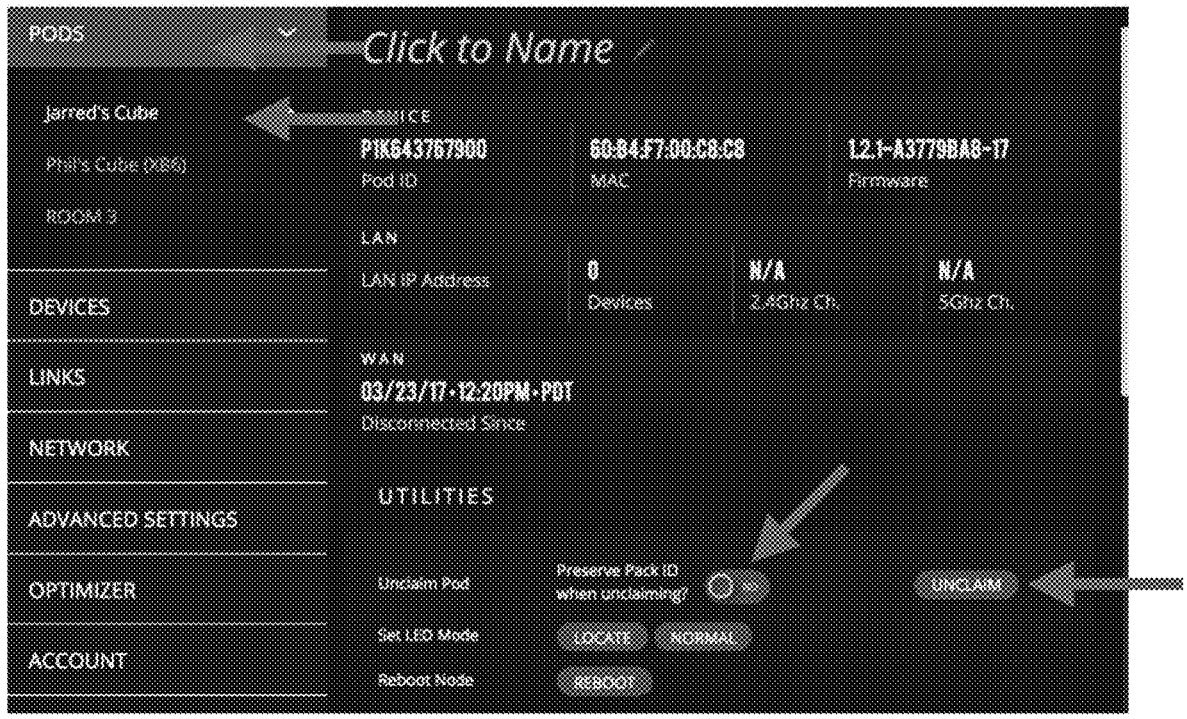
FIGS. 26 and 27 are screenshots of an access point tab for unclaiming.
Figure 27:
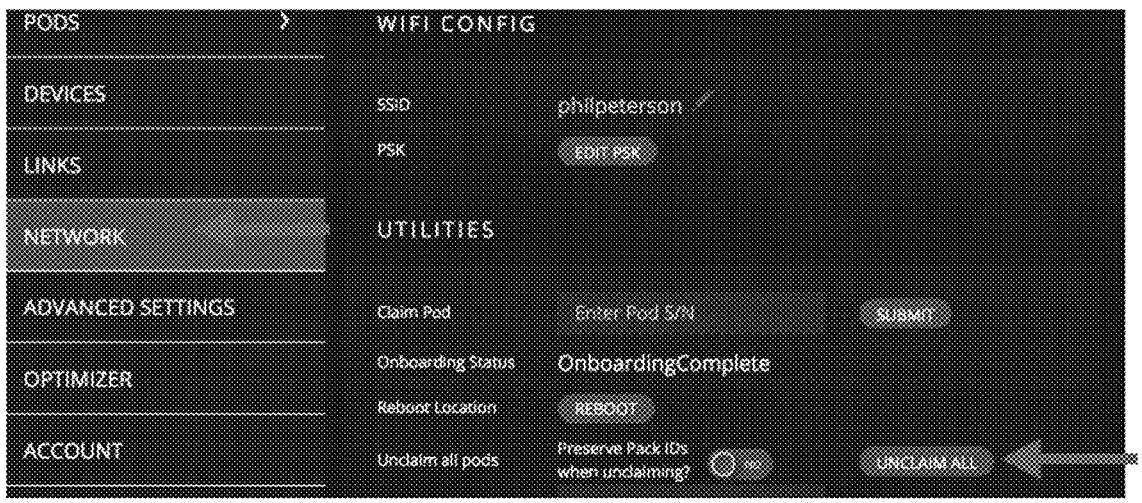

Optionally, access points can be unclaimed (step 612). It is possible also to remove access points from a given account as shown in FIG. 26—select PODS Tab; a list of all the access points in that account will appear; select the access points to remove from the account, and click unclaim. As described earlier, often, the access points are shipped in a group). If the preserve pack ID when the unclaiming button is not selected then that access point is disassociated from the group permanently. The sole purpose of Pack ID is to provide a shortcut to the user by allowing to enter one single serial number in the Pack and claiming the rest of the access points in that Pack automatically. Similarly, it can provide a shortcut for unclaiming groups of access points. Once the access point is unclaimed without preserving the Pack ID, that access point will be considered to belong to a pack of one. Finally, a factory reset can be performed (step 614), such as to remove all access points from a given account as shown in FIG. 27.

NOC Dashboard Operations—Finding an Account

Figure 28:
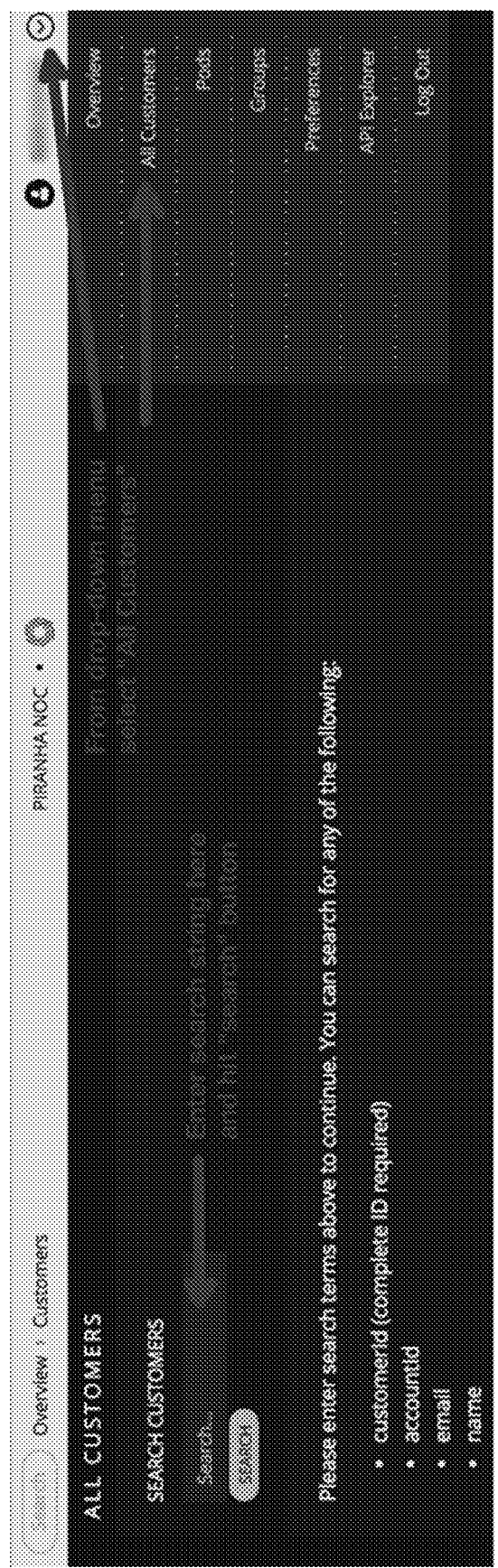
FIG. 28 is a screenshot of finding accounts.

FIG. 28 is a screenshot for finding accounts. To find an existing account—1) hover over the username at the top-right corner of the NOC screen to activate a drop-down menu, 2) from the drop-down menu, select "All Customers," 3) in the Overview>Customers screen, type in the search string and then hit the "search" button, the search string may be the account's partial name, partial email address, partial accountId, or complete customerId, and 4) select the account from the search results. Additionally, at any time, the "Search" field on the top left corner of the screen may be used to find any account by name.

NOC Dashboard Operations—Groups—Concept and Management

Figure 29:
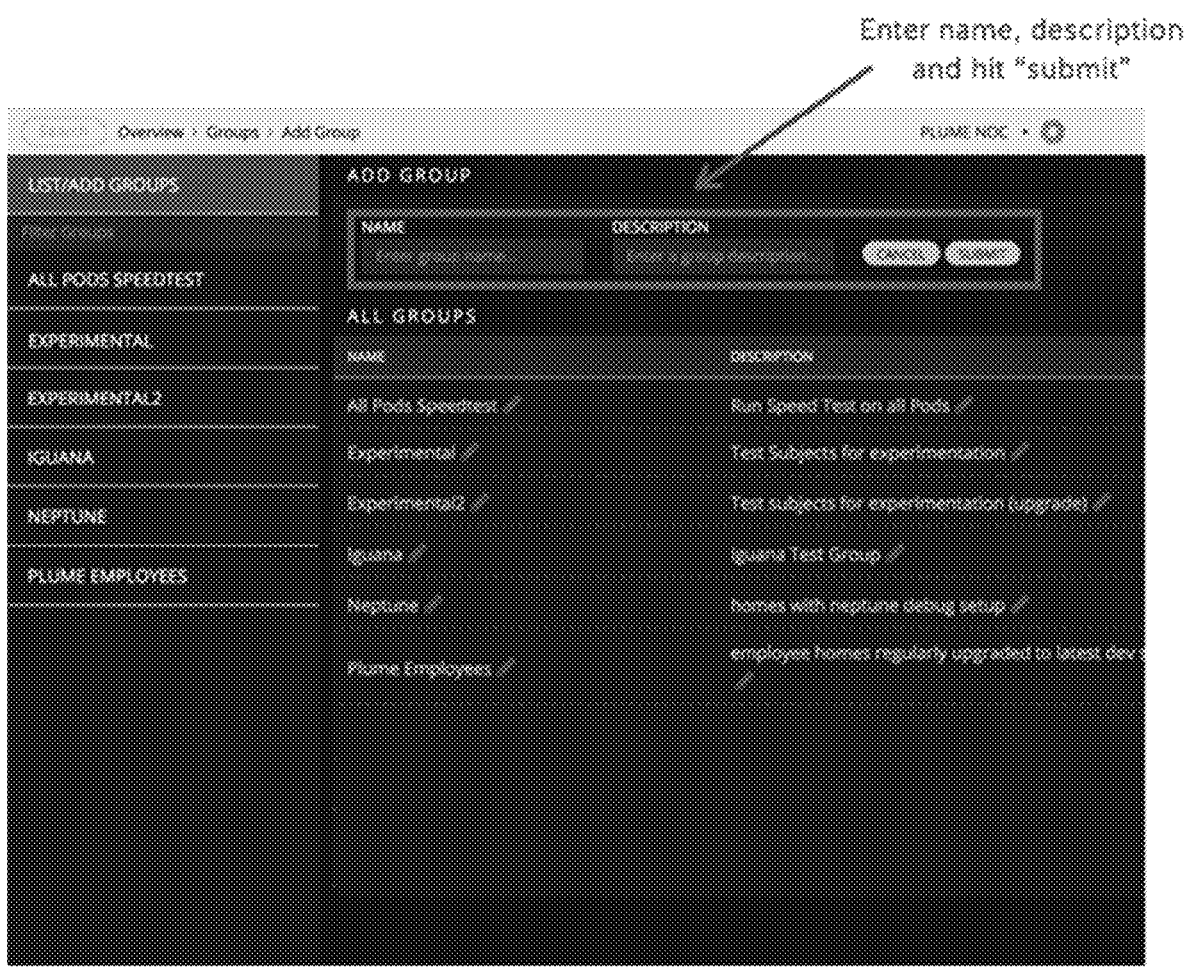
FIG. 29 is a screenshot of a groups tab for adding a new group.

A "Group" is a construct designed to help separate accounts into groups that can separately protected from visibility and actions of "Group Administrators." The rules for Groups are simple: an account that has been given "Group Admin" privilege can only see and administer other accounts belonging to the same Group. FIG. 29 is a screenshot of a groups tab for adding a new group. To create a new group—1) hover over the username at the top-right corner of the NOC screen to activate the drop-down menu, 2) from the drop-down menu, select "Groups," and 3) near the bottom of the Overview>Groups screen, enter the new group's name and description, then hit the "submit" button.

Figure 30:
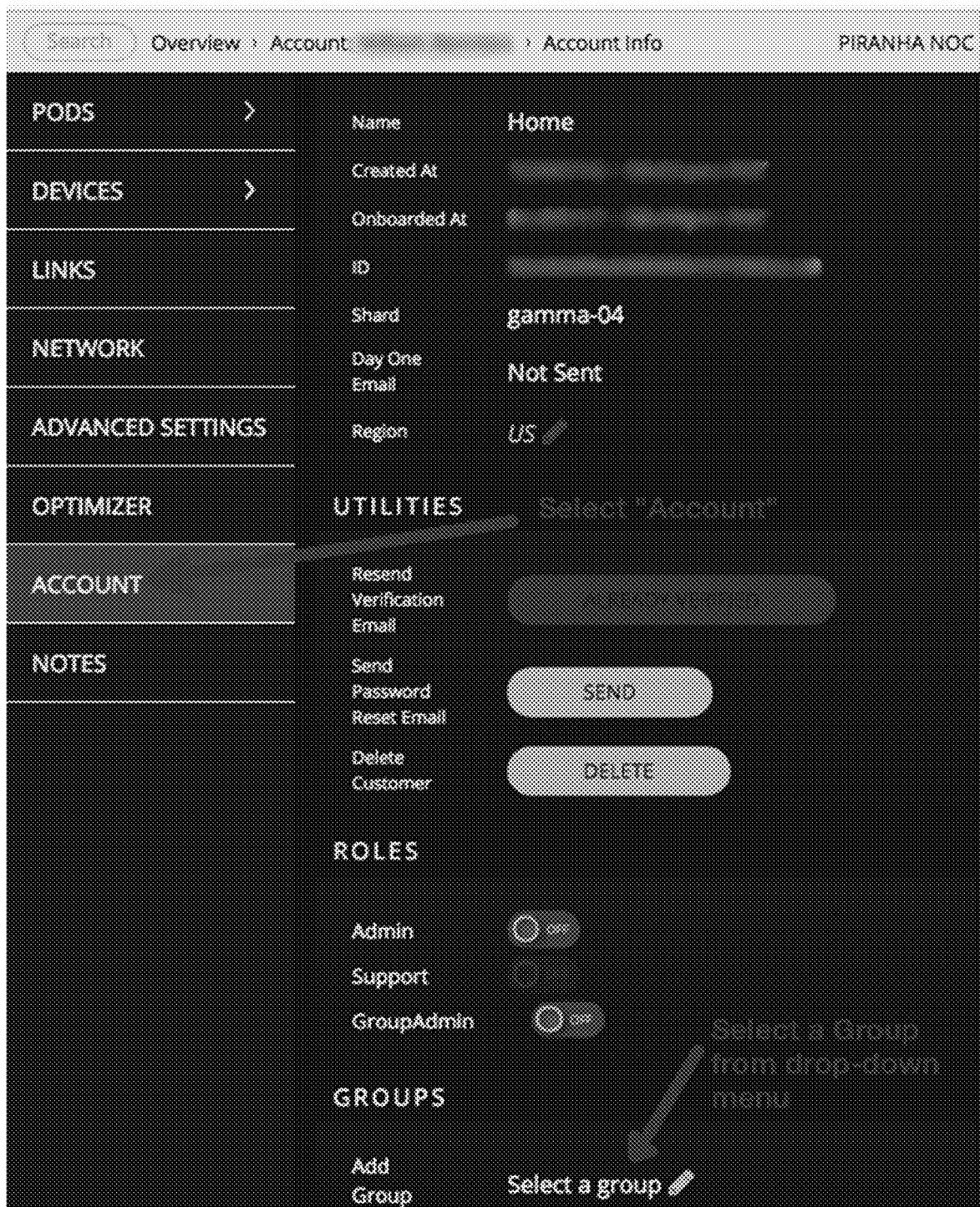
FIG. 30 is a screenshot of account administrative actions and reports.

FIG. 30 is a screenshot of adding accounts to a group. To add an account to a Group—1) select and go to an Account (see the "Finding an Account" section above), 2) in the Overview>Account: [name] screen, select the "Account" tab from the left panel, 3) scroll down the middle pane, near the bottom, click "Select a group" to activate a Group selection drop-down menu, and 4) select a Group from the drop-down menu and hit the "submit" button. Note, an account can be added to multiple Groups.

NOC Dashboard Operations—Network View

Figure 31:
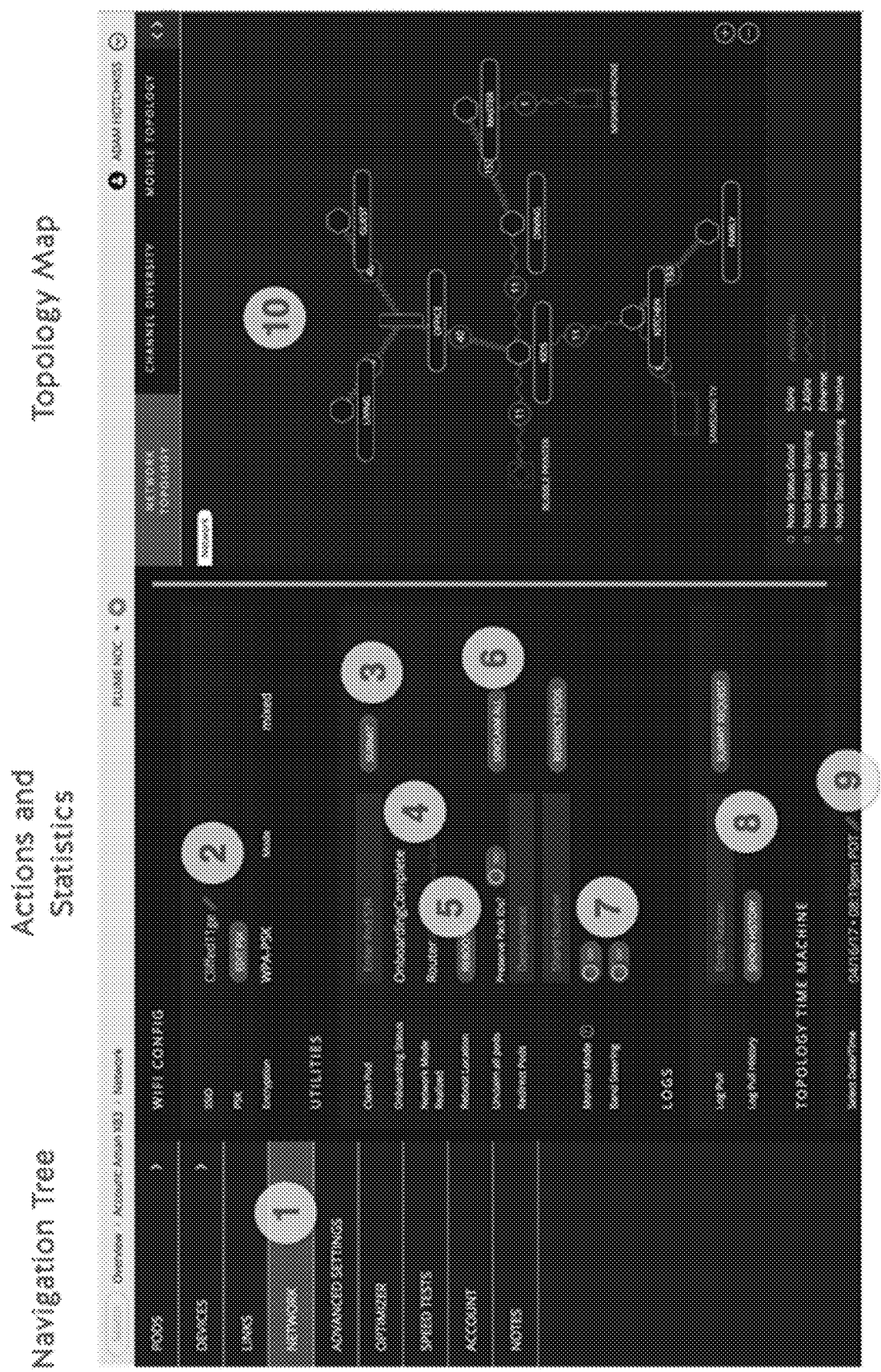
FIG. 31 is a screenshot of the NOC dashboard illustrating a navigation tree, actions and statistics, and a network topology map.

FIG. 31 is a screenshot of the NOC dashboard illustrating a navigation tree, actions and statistics, and a network topology map. The items in the NOC dashboard are as follows:

| No. | Function | Description |
|---|---|---|
| 1 | Navigation Tree | Select these tabs to navigate between the different functions. |
| 2 | SSID and PSK | Read or change the SSID/PSK for all APs on the network |
| 3 | Claim APs | Enter the AP ID to claim new APs or gateways to the customer network |
| 4 | Helpful Network Status for Support | These fields provide status if: 1) The customer has finished with App Onboarding 2) If the Network is in Router or Bridge mode |
| 5 | Reboot network | Reboots ALL APs in the network location |
| 6 | Unclaim all APs | Selecting this button removes ALL the APs from the location. When selecting "Preserve Pack IDs" toggle, then the APs will retain their original Pack grouping. If it is not selected, then each AP will be isolated without any grouping. |
| 7 | Network Settings | Monitor Mode: When selected, the GW can ONLY be monitored for statistics. No provisioning or channel changes are permitted in this mode. Band Steering: Enable or disable band steering for the location. |
| 8 | Log Pull | Use this function to generate and upload Logs from each AP to the cloud. This function should only be performed with proper training. A reason for the log pull should be descriptive and present for all log pulls. A history of the previous log pulls, their descriptive reason and the Uniform Resource Locator (URL) where they are located is provided. |
| 9 | Topology Time Machine | Set the time to view the network connections at that time in the network topology frame. It may take a few seconds to pull up the result depending on the number of historical topologies saved in the database. |
| 10 | Network Topology View | This frame holds details of the AP-to-AP and AP-to-Device connection details. Connections are updated in real time through events (e.g., a device connecting to an AP) |

Figure 32:
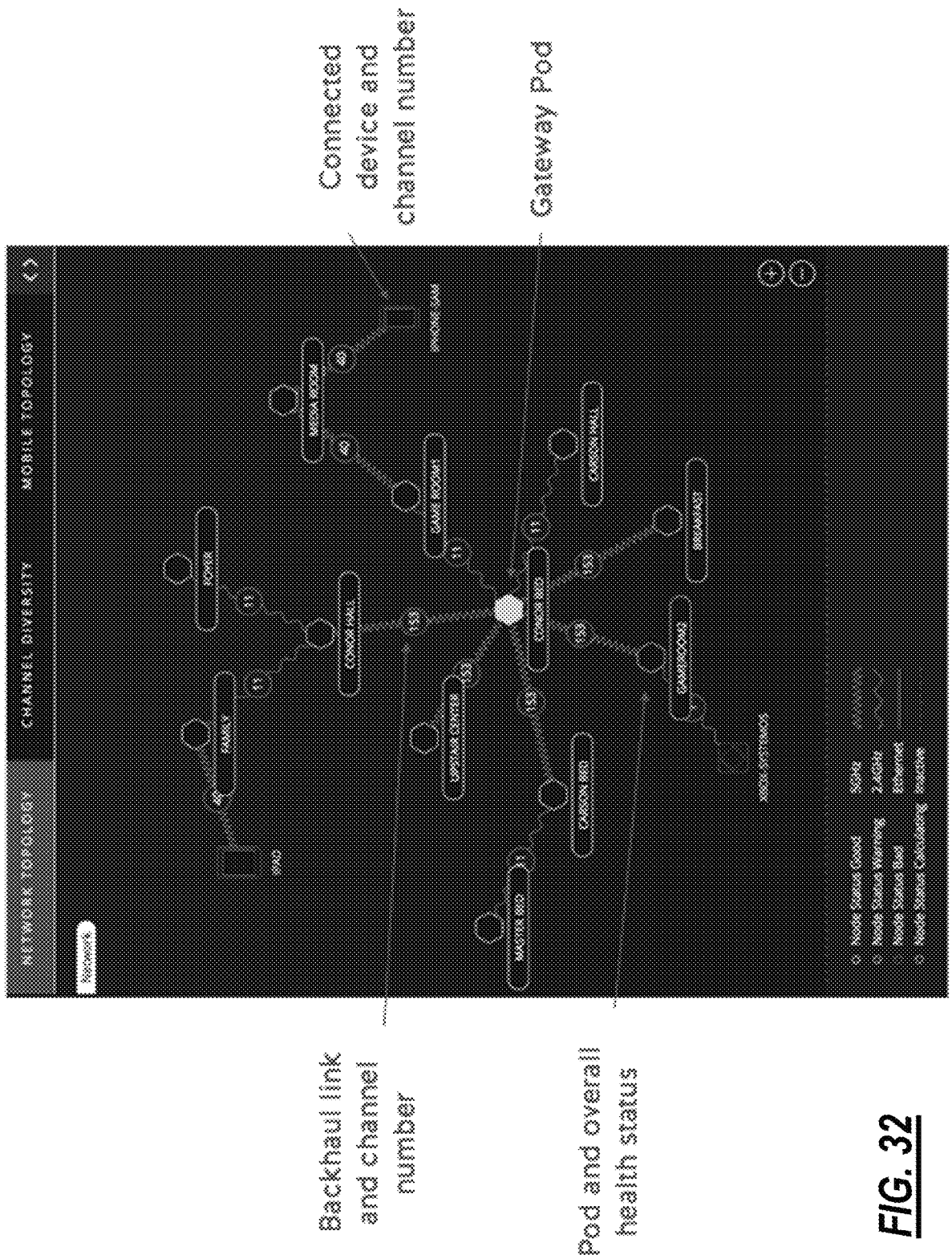
FIG. 32 is a screenshot of a network topology view.

FIG. 32 is a screenshot of a network topology view. Once a user account has been selected, the network topology view is displayed on the right side of the screen. The network topology view comprehensively shows the state of the network, including all Pods (access points) that are parts of the network and all end-user devices connected to the network. The user can click on an access point, an end-user device, or a link channel number to see more information specific to the access point, end-user device, or link.

NOC Dashboard Operations—Account Details

Figure 33:
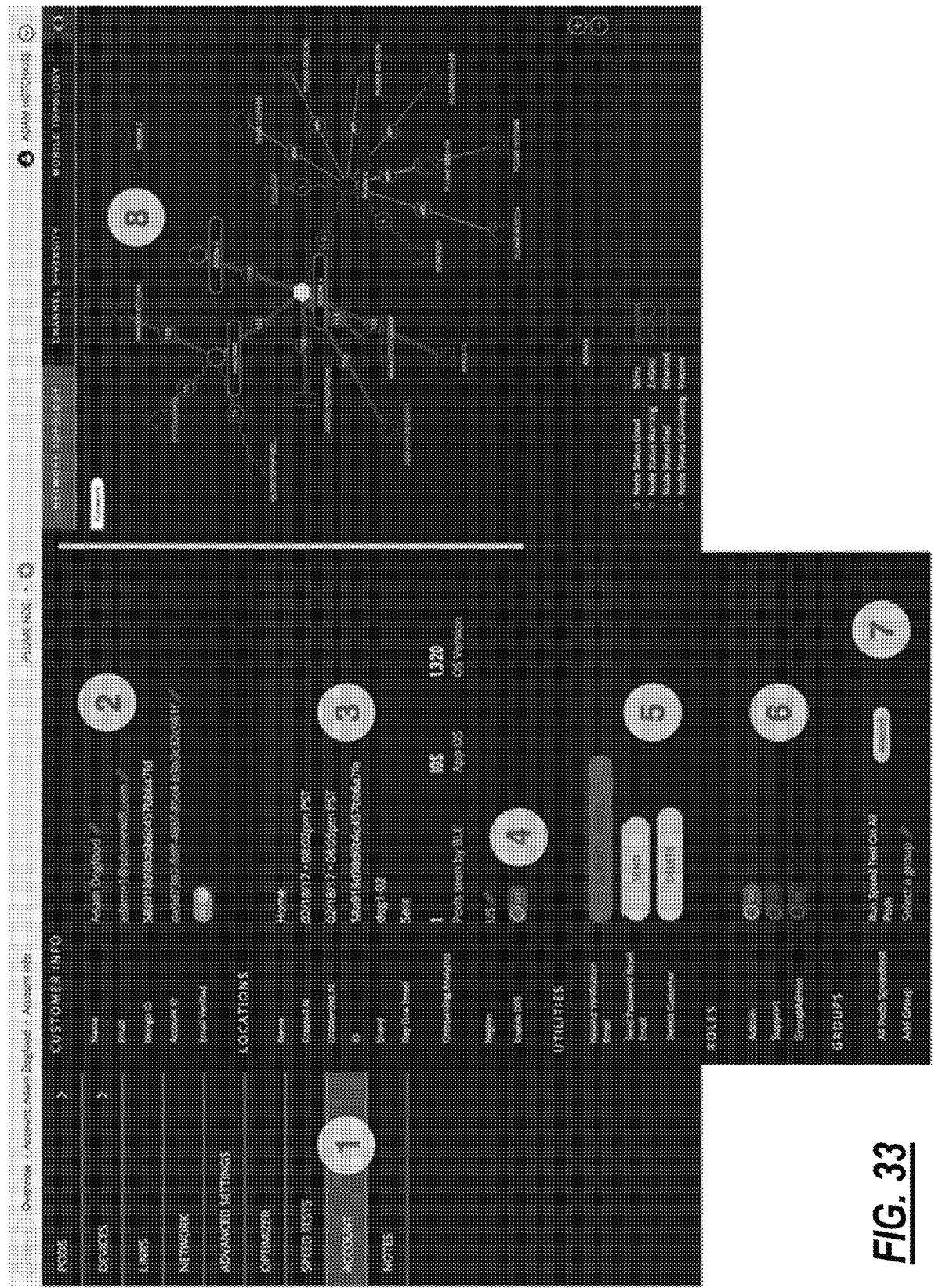
FIG. 33 is a screenshot of an account view providing details about the account owner and permissions.

FIG. 33 is a screenshot of an account view providing details about the account owner and permissions. The items in the NOC dashboard in FIG. 33 are as follows:

| No. | Function | Description |
|---|---|---|
| 1 | Navigation Tree | Select these tabs to navigate between the different functions. |
| 2 | Account Details | The Account Details contains the following: 1) Name (editable) 2) Email (editable) 3) Mongo ID (database reference key) 4) Account ID (editable) 5) Email verified toggle (email verification is required for NOC login) |
| 3 | Location Details | The Location Details section contains the following information about the network location: 1) Location name (defaults to "Home") 2) Date and time the account was created 3) Date and time the APs were onboarded 4) Location ID (database key) 5) Number of APs seen during onboarding, phone type used and version of app used for onboarding |
| 4 | Geographic Location | These settings select the Region (e.g., US, EU, CA) for channel selection as well as the permitted use of DFS channels for that location. |
| 5 | Location Utilities | The following actions are allowed for the account: 1) Resend verification email if the user has never verified the email 2) Send an email to ask the user to reset the email password 3) Unclaim all the APs and delete the account. This is NOT recommended. |

| No. | Function | Description |
| --- | --- | --- |
| 6 | Roles | Set the user login to have Admin or Group Admin privileges for remote monitoring. |
| 7 | Groups | Add the location ID to any Groups to control the visibility to only accounts within that Group. |
| 8 | Network Topology View | This frame holds details of the AP-to-AP and AP-to-Device connection details. Connections are updated in real time through events (e.g., a device connecting to an AP) |

NOC Dashboard Operations—Access Point View for an Account

Figure 34:
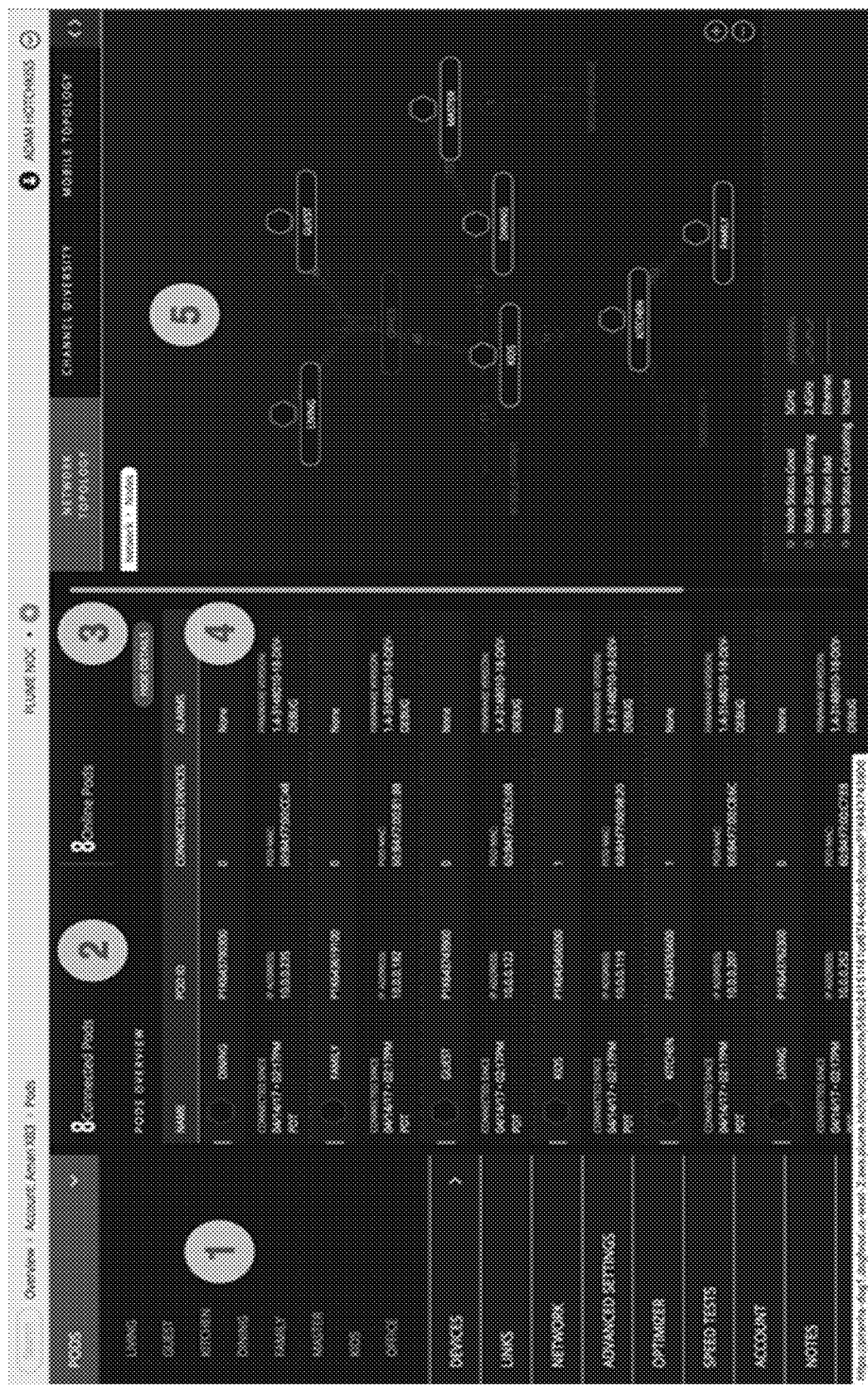
FIG. 34 is a screenshot of an access point view illustrating all access points associated to an account.

FIG. 34 is a screenshot of an access point view illustrating all access points associated to an account. To show more details about the access points, click on the "SHOW DETAILS" button in the middle pane. The button toggles between "SHOW DETAILS" and "HIDE DETAILS." To get all the details for a particular Pod, click on the Pod's name. The items in the NOC dashboard in FIG. 34 are as follows:

| No. | Function | Description |
| --- | --- | --- |
| 1 | Navigation Tabs | Select these tabs to navigate between the different functions. |
| 2 | Pod Status | Lists the total number of APs claimed to the account location and the number of APs currently online. |
| 3 | AP Detail Enable | Select this button to see AP Details. |
| 4 | AP Details | The following AP details are provided: 1) AP Nickname/Location 2) Serial number 3) No. connected devices 4) Alarm State 5) Connected since or connected last 6) IP Address 7) MAC Address 8) Firmware version |
| 5 | Network Topology View | This frame holds details of the AP-to-AP and AP-to-Device connection details. Connections are updated in real time. Only the APs are highlighted in this view. |

NOC Dashboard Operations—Client Devices View

Figure 35:
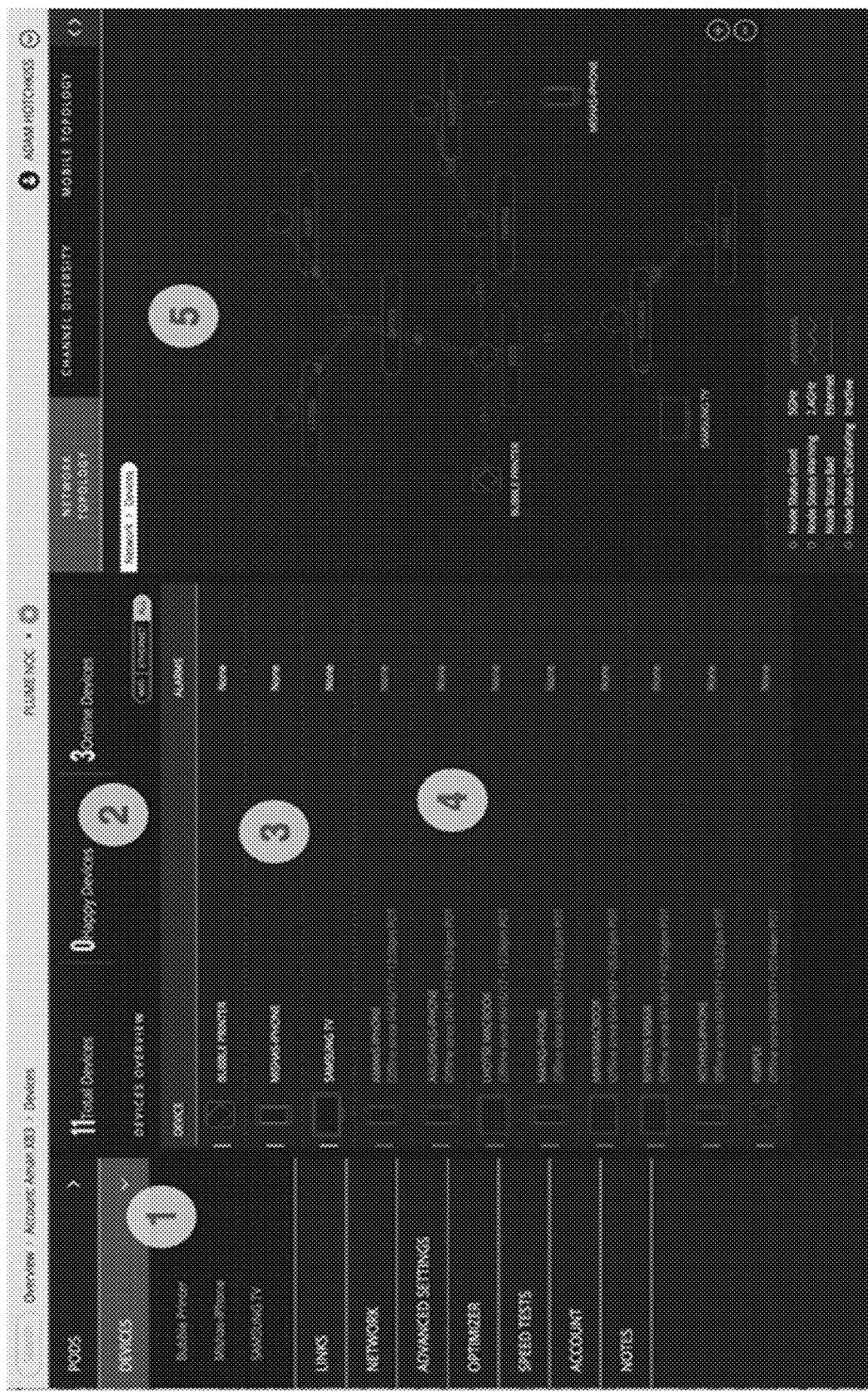
FIG. 35 is a screenshot of a client devices view illustrating all client devices connected in a Wi-Fi network associated with an account.

FIG. 35 is a screenshot of a client devices view illustrating all client devices connected in a Wi-Fi network associated with an account. The list shows currently connected as well as recently disconnected devices. The items in the NOC dashboard in FIG. 35 are as follows:

| No. | Function | Description |
| --- | --- | --- |
| 1 | Navigation Tabs | Select these tabs to navigate between the different functions. |
| 2 | Device Status | Lists the total number of Devices seen by the network in the last 14 days, number of devices without alarms, and number of devices currently online. |
| 3 | Online Device List | Shows the online devices, their hostname or MAC if the hostname is not available and if any alarms are active. |
| 4 | Offline Device List | Shows the offline devices, their hostname or MAC if the hostname is not available, the recent alarm state when it went offline and the time it was last seen online. |
| 5 | Network Topology View | This frame holds details of the AP-to-AP and AP-to-Device connection details. Connections are updated in real time. Only the Devices are highlighted in this view. |

NOC Dashboard Operations—AP-to-AP Link PHY Rates

Figure 36:
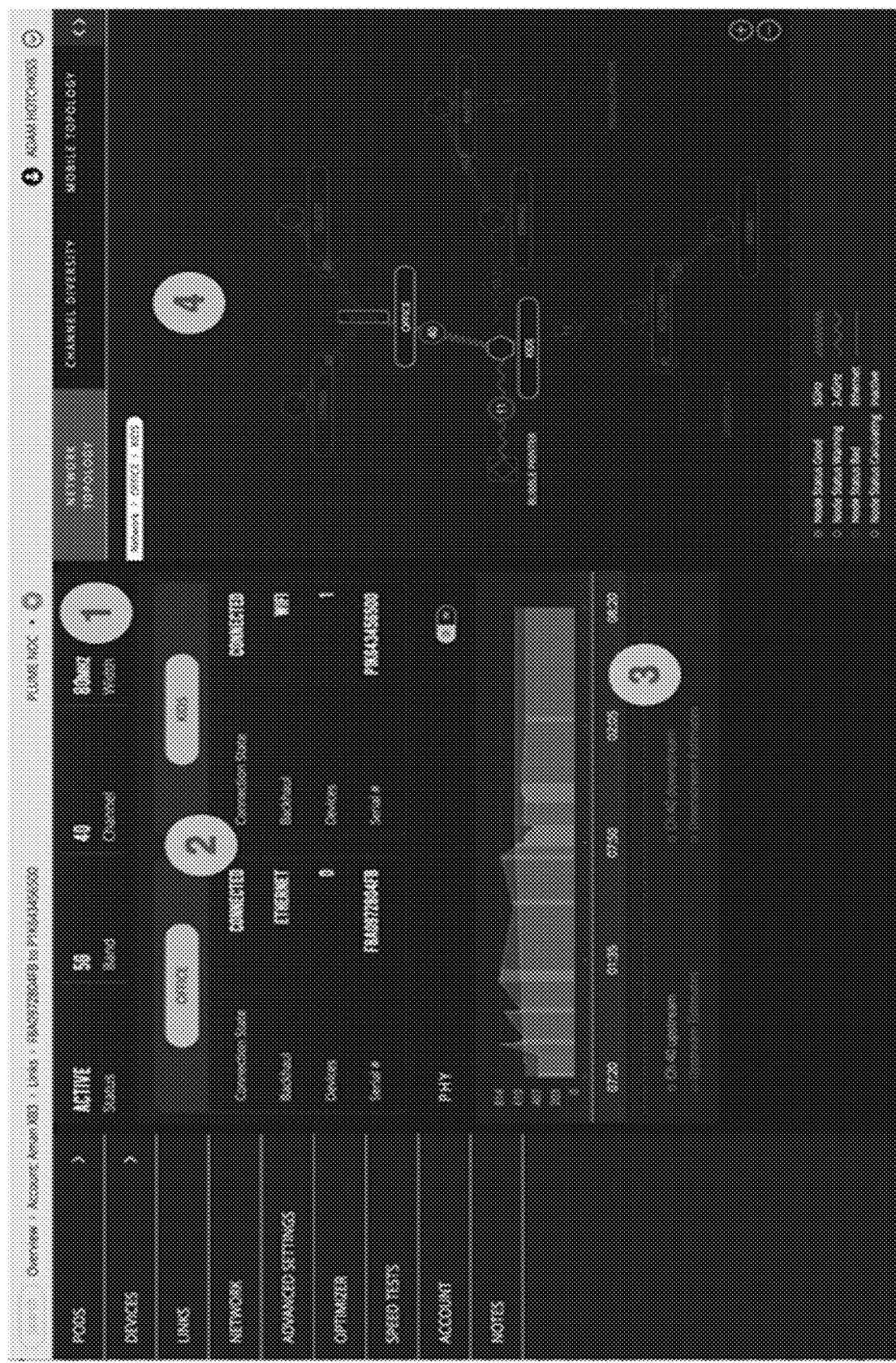
FIG. 36 is a screenshot of backhaul link information.

FIG. 36 is a screenshot of backhaul link information. By clicking on the channel number in the Network Topology Map of any backhaul connection, the observed PHY rates for both the uplink and downlink direction is graphed. The PHY rates can be only available when more than 1 MB of traffic is transferred in the minute. The items in the NOC dashboard in FIG. 36 are as follows:

| No. | Function | Description |
| --- | --- | --- |
| 1 | Link Summary | Provides the status of the link, including WiFi band (2.4 GHz or 5 GHz), channel and channel bandwidth. |
| 2 | Link Details | The link details provide information of the link "From" and "To" to define the direction of the link data. Additional details include the AP IDs and the backhaul connection details. |
| 3 | PHY Rate Graph | When more than 1 MB per minute is transferred on the link, a weighted average PHY rate measurement is recorded and graphed in both directions. A 24 hour or 1-week timeline view is available. |
| 4 | Network Topology View | This frame holds details of the AP-to-AP and AP-to-Device connection details. Connections are updated in real time. Only the link selected and any connected clients are shown on the map. |

NOC Dashboard Operations—Device Details

Figure 37:
FIG. 37 is a screenshot of client device details for an individual device.

FIG. 37 is a screenshot of client device details for an individual device. By selecting any Device from the Device List or on the topology, the details and history of statistics of that device are shown. The items in the NOC dashboard in FIG. 37 are as follows:

| No. | Function | Description |
| --- | --- | --- |
| 1 | Device | List When selecting the Device navigation tab, a list of connected devices will appear in the navigation tree. Each device is selectable to see details of the device. |
| 2 | Device Summary | The summary of the Device includes: 1) Device Nickname, which is editable 2) MAC address 3) IP address 4) Connected AP 5) Channel 6) Connection Health Status |
| 3 | Band Steering Details | Band Steering details include: 1) If the device is capable of 2.4 GHz and 5 GHz connections based on connection history, the capability is shown by the green check mark for having connected on that band or red "X" for never having connected on that band 2) Device band steering metrics for each connecting AP, which include a number of failed attempts, successful attempts, connections, disconnections and sticky client kicks. Sticky client kicks occur for devices that "stick" to the AP even when the RSSI is very low. |
| 4 | Data Consumption Summary | Provides the Wi-Fi data consumption in both the UL and DL direction for the last 24 hours, 7 days and 30 days. |
| 5 | RSSI | Graphs the 25th percentile and 75th percentile of the |

| No. | Function | Description |
|---|---|---|
|  | History | RSSI readings for each 15 minutes. Both 24 hour and 7-day histories are available. Connections on 2.4 GHz are color-coded with white and red lines, and 5 GHz connections are shown with dark and light blue lines so the user can quickly determine the propensity of the device to connect on either band. Averages over the graph period for both 2.4 GHz and 5 GHz readings are shown. |
| 6 | Coverage Alarms | For both 24 hour and 7-day histories, the Coverage Alarm is shown for the connected device. Alarms are triggered for each 15-minute window if the RSSI falls below a predefined threshold. The percentage of time the device is in alarm is summarized as a percentage. If the device is not connected during a 15 minute period, no data is shown. |
| 7 | Bandwidth Usage | This graph shows the UL and DL data transmitted each 15-minute increment for the past 24 hours and 7 days period. Total data consumption numbers are summarized for the graph. |
| 8 | Network Topology View | This frame holds details of the AP-to-AP and AP-to-Device connection details. Connections are updated in real time. Only the active Device and the APs used to connect the device back to the GW are shown in this view. |

NOC Dashboard Operations—Device Health Metric

Figure 38:
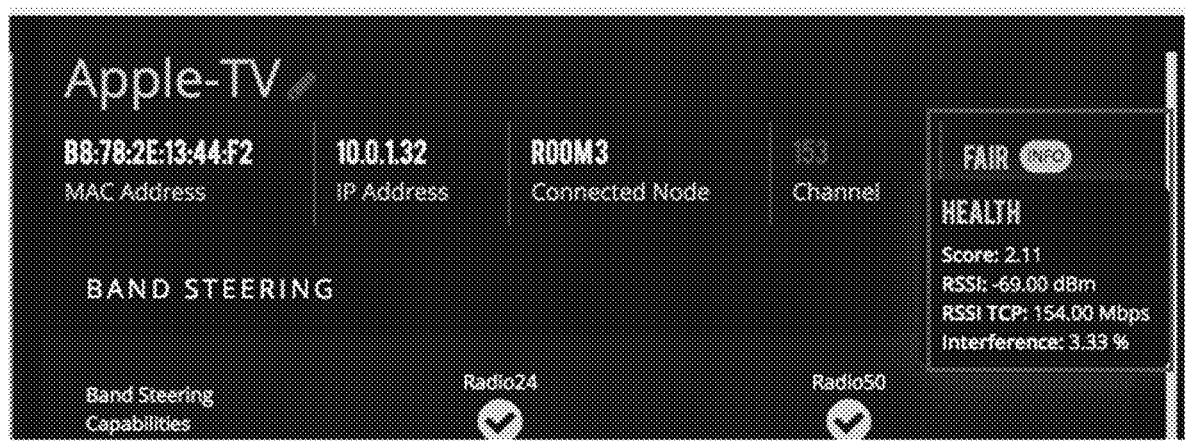
FIG. 38 is a screenshot of device health for an exemplary client device.

FIG. 38 is a screenshot of device health for an exemplary client device. The Device Health Metric values can be seen by hovering over the status. The Health Metric determines the health or quality of the Wi-Fi connection to the device and is split up into the following four main indicators:

Excellent—The connection quality is very high without impairments from interference.

Good—The connection quality has a good estimated bit rate with little to no interference.

Fair—The connection estimated bit rate may not be good enough to sustain services like 4 k video streaming, because of low RSSI, MCS or moderate interference.

Poor—The connection RSSI or PHY rates are very low, or the link is experiencing very high interference. Connectivity to the device is possible, but streaming or real-time services may not work well without buffering or degraded service.

Each minute, a connected device can have a Health Metric Score calculated based on the following inputs:

Score—A score from 1 to 5 is generated for the link, which is helpful for troubleshooting purposes.

RSSI—The RSSI of the connected device is collected per minute and shown in dBm.

RSSI or PHY Rate converted to TCP—Based on the read RSSI or when data is present the actual PHY Rate of the connection, the system calculates the maximum TCP bitrate possible (e.g., like running a speed test) between the access point and the Device. This value is shown Mbps.

Interference—The amount of airtime taken by outside Interference from a neighboring AP or other APs in the same home is shown. The TCP bitrate is affected proportionally by the amount of interference and is used in the calculation of the connection Health Metric.

The capability of the connected device—Devices supporting 802.11ac vs. 802.11n and different MIMO capabilities are scored differently. The maximum capabilities of each device are determined based on statistics collected about the device.

Note, the connection health metric is measuring the quality of the connection between the last access point and selected Device. It is not taking into consideration the speed of the backhaul connection speed.

NOC Dashboard Operations—Access Point View for an Account

Figure 39:
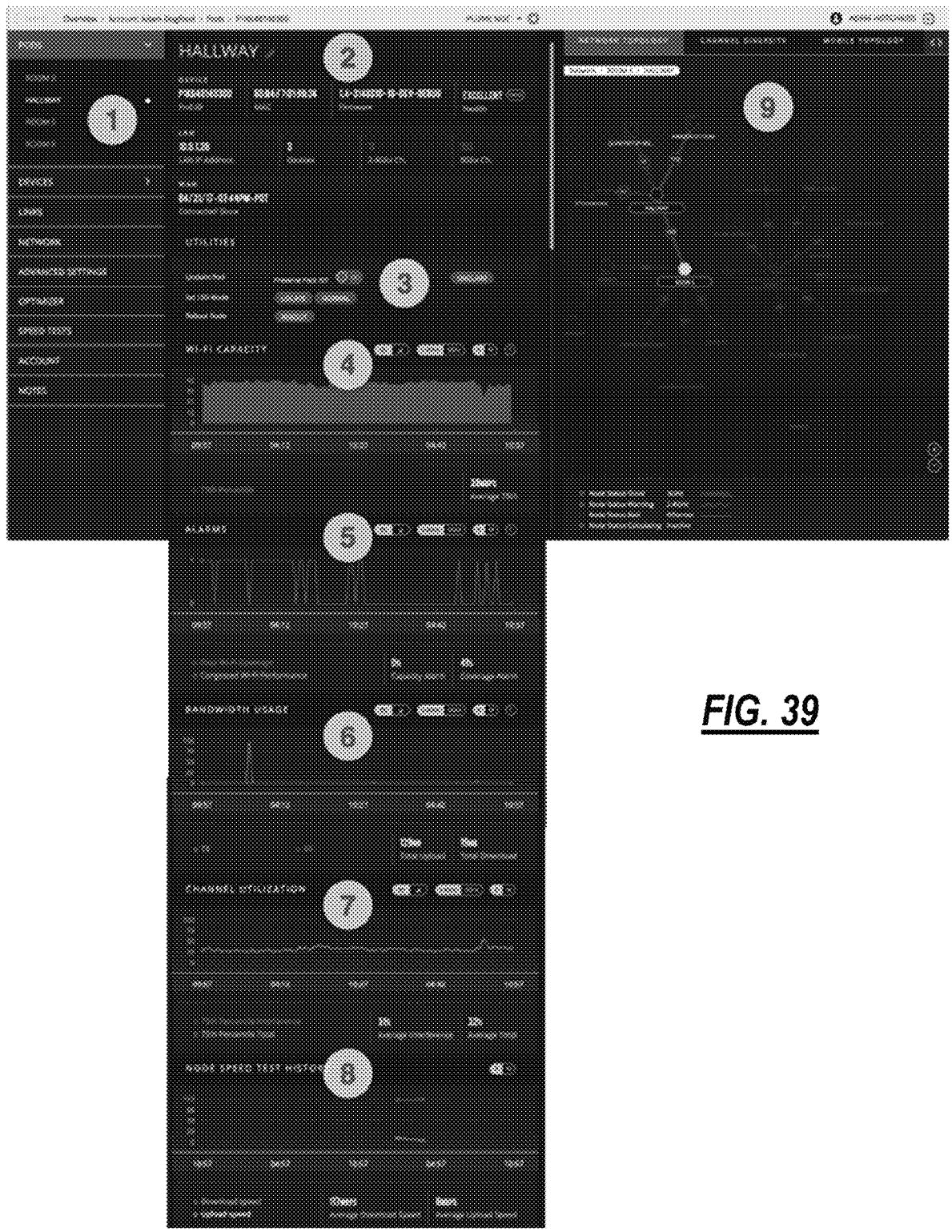
FIG. 39 is a screenshot of an access point view.

FIG. 39 is a screenshot of an access point view. The items in the NOC dashboard in FIG. 39 are as follows:

| No. | Function | Description |
|---|---|---|
| 1 | Pod (AP) List | When selecting the Pod navigation tab, a list of the connected APs is shown in the sub-navigation tree. |
| 2 | AP Summary | The summary of the AP includes: 1) Device Nickname (editable) 2) AP ID (Serial Number in the case of a Pod) 3) MAC address 4) FW version 5) Connection Health Metric (more about this below) 6) LAN IP address as assigned by upstream DHCP server to the Pod/AP 7) No. of connected devices 8) WiFi channel assigned to both radios 9) Time since the device was connected to the WAN IP |
| 3 | AP Utilities | Three utilities exist in this menu: 1) Unclaim the Pod or AP from the location with the option of preserving the original package ID with the other Pods 2) Flash the LED by placing the Pod into a "Locate Mode" or place it back to normal be selecting "Normal" 3) Reboot the Pod remotely |
| 4 | WiFi Capacity Measurement | The WiFi Capacity measurement is on a per-radio basis and estimates the total capacity the radio can send to connected clients and backhaul connections simultaneously with limitations of the current connections. The metric takes into account PHY rates, the capability of the connected clients, the ratio of airtime required to send data for each client and the amount of interference to determine the overall capacity. The WiFi Capacity measurement is valid only when data is being transmitted on the AP radio. This metric can be greatly affected depending on the WiFi connected device capabilities. Large shifts in WiFi capacity is a sign that something has changed with that WiFi network affecting WiFi speed available. For example, if a slow device connects to the WiFi radio, it has the potential to bring down the speed of the network for other connected devices. Based on the amount of traffic consumed by the slow device, the overall WiFi capacity of the radio will be reflected in the graph. |
| 5 | Coverage Alarms | For both 24 hour and 7-day histories, the Coverage Alarm is shown for the AP if any Device connected to the AP is in alarm. Alarms are triggered for each 15-minute window if the RSSI falls below a predefined threshold. The percentage of time the AP is in alarm is summarized as a percentage. A capacity alarm is also shown if the capacity of the AP to all of it's associated clients drops below a threshold. |
| 6 | Bandwidth Usage | This graph shows the UL and DL data transmitted for each 15-minute increment for the past 24 hours and 7 days period. Total data consumption numbers are summarized for the graph. |
| 7 | Channel Utilization | This graph shows two airtime statistics: 1) Total Channel Utilization Total Channel Utilization represents the total airtime used as a percentage by the AP/Pod and from Interference from a neighboring AP on the same channel 2) Interference Interference is showing the airtime used as a percentage ONLY by a neighboring AP on the same channel. The difference between these two readings is the amount of airtime used by the AP to Tx and Rx data from connected devices and backhaul connections. For example, if the Total Channel Utilization is 80% and the Interference is 40%, then the AP is using 40% of the airtime for Tx and Rx traffic and 40% is |

-continued

| No. | Function | Description |
|---|---|---|
| | | used by Interference. Readings are provided for both 2.4 GHz and 5 GHz radios. 24 hour and 7 days histories are available, each one showing readings in 15-minute increments. |
| 8 | Speed Test Results | This graph shows the UL and DL speed test results for 24 hours and 7 day periods of time. Speed test results are optionally run for AP and run Ookla style speed test between the AP and a server on the Internet. |
| 9 | Network Topology View | This frame holds details of the AP-to-AP and AP-to-Device connection details. Connections are updated in real time. Only the active Pod/AP and the APs used to connect back to the GW are shown in this view. |

NOC Dashboard Operations—AP Health Metric

Figure 40:
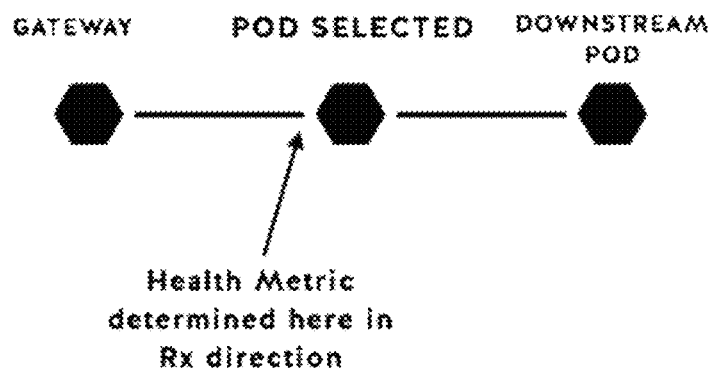
FIG. 40 is a network diagram of a Wi-Fi network illustrating an AP health metric.
Figure 41:
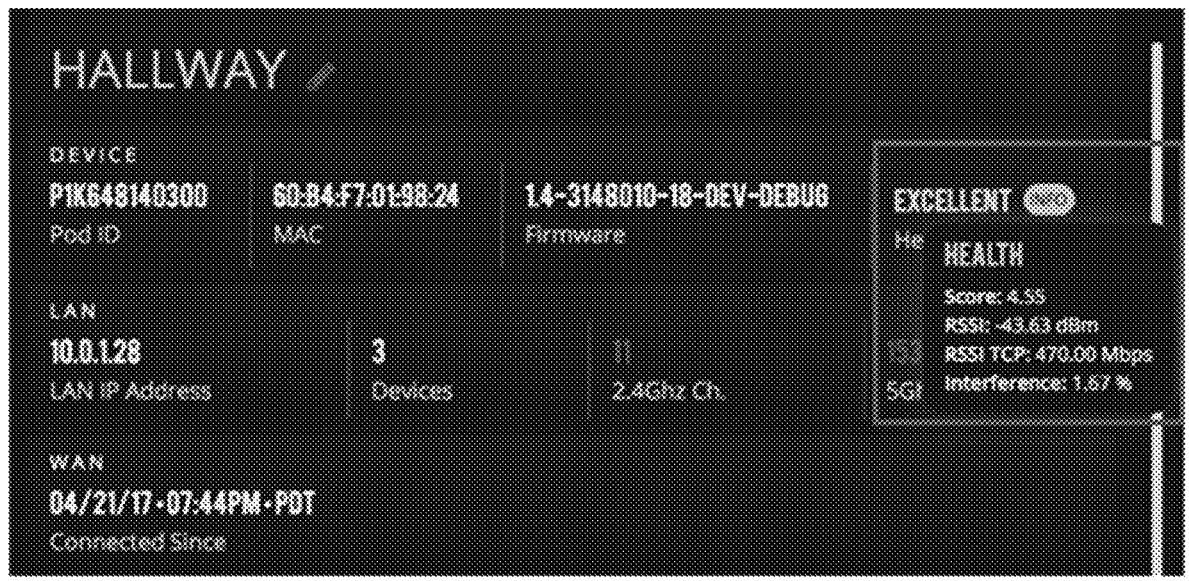
FIG. 41 is a screenshot of an AP health metric view.

FIG. 40 is a network diagram of a Wi-Fi network illustrating an AP health metric and FIG. 41 is a screenshot of an AP health metric view. The AP Health Metric values can be seen by hovering over the status. The AP Health Metric determines the health or quality of the Wi-Fi backhaul connection in the Rx direction connection to the access point coming from another access point upstream towards the Gateway as shown in FIG. 40. The value of the AP health metric can be similar to the device health metric.

NOC Dashboard Operations—Optimizer

Figure 42:
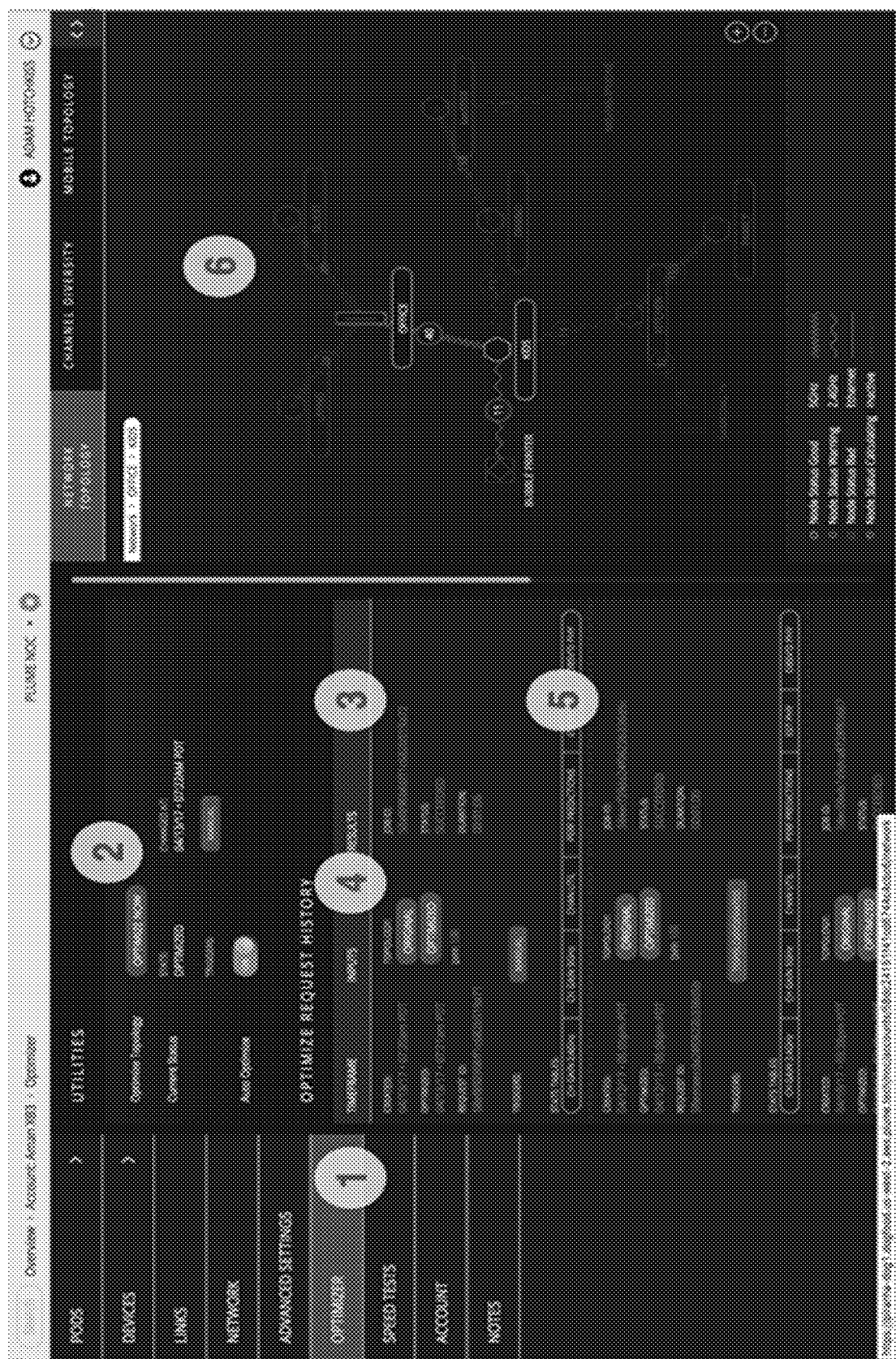
FIG. 42 is a screenshot of an optimizer view.

FIG. 42 is a screenshot of an optimizer view. The Optimizer reads the status of the network and performs optimizations based on events, such as new APs joining the network, Wi-Fi interference over long periods of time, RSSI between APs changing significantly, etc. By selecting the "Optimizer" tab on the navigation tree, the following view in FIG. 42 is present. The items in the NOC dashboard in FIG. 42 are as follows:

| No. | Function | Description |
|---|---|---|
| 1 | Navigation Tabs | Select these tabs to navigate between the different functions. |
| 2 | Optimizer Status | The Optimizer status contains the following: 1) Option to manually kick off an optimization by selecting the "Optimize Now" button. This is only valid if an optimization is not already in progress. 2) Current State and the time the state was changed. The allowed states are: Optimized - The network is optimized. In Progress - An optimization is underway. Failed - The previous optimization failed to configure the network. 3) The Triggers status provides the reason for the optimization change. This could be for Manual - The button was pressed to start an optimization manually. Topology Deviated - An AP-to-AP connection in the topology changed, requiring a re-optimization to occur. Stats Changed - The statistics (e.g., interference, RSSI or PHY rates) for the link changed by such an amount as to re-trigger an optimization. 4) Toggle to turn On or Off the system auto optimizations. If this is disabled, the location network will not optimize unless the "Optimize Now" button is pressed. |
| 3 | Optimization History | For each optimization that occurs in the network, an event is captured and available for review. Each event includes: 1) Job ID for database reference of the optimization 2) Status: Succeed/In Progress/Failed |

-continued

| No. | Function | Description |
|---|---|---|
| | | 3) Duration of the optimization from start to finish, including network topology changes 4) Created Date: date and time the optimization started 5) Optimized: date and time the optimization finished 6) Request ID for database reference of the optimization request 7) Trigger describing why the optimization occurred (see above for Trigger descriptions) |
| 4 | Topology Changes | Select the "Original" and "Optimized" buttons to see the topology connections when the optimization request was made and the suggested topology from the optimizer. The Optimized topology suggested by the optimizer might not match the current network topology if the topology changes failed to occur. |
| 5 | Stats Tables | The Optimizer stats tables record the input fed to the optimizer for the reference job. The stats tables include: 1) RSSI Channel Gains between each AP in the network for both 2.4 GHz and 5 GHz connections 2) The amount of airtime that is busy for each AP and each channel at the time of the optimization request. 3) Performance Predictions from the GW Pod to each AP/Pod for the chosen topology. 4) The estimated PHY rates for each AP-to-AP connection. 5) The actual observed PHY rates for each AP-to-AP connection for the topology, when available. |
| 6 | Network Topology View | This frame holds the current or historical network topology as selected in the optimization history. |

Wi-Fi Network Control via an NOC

Figure 43:
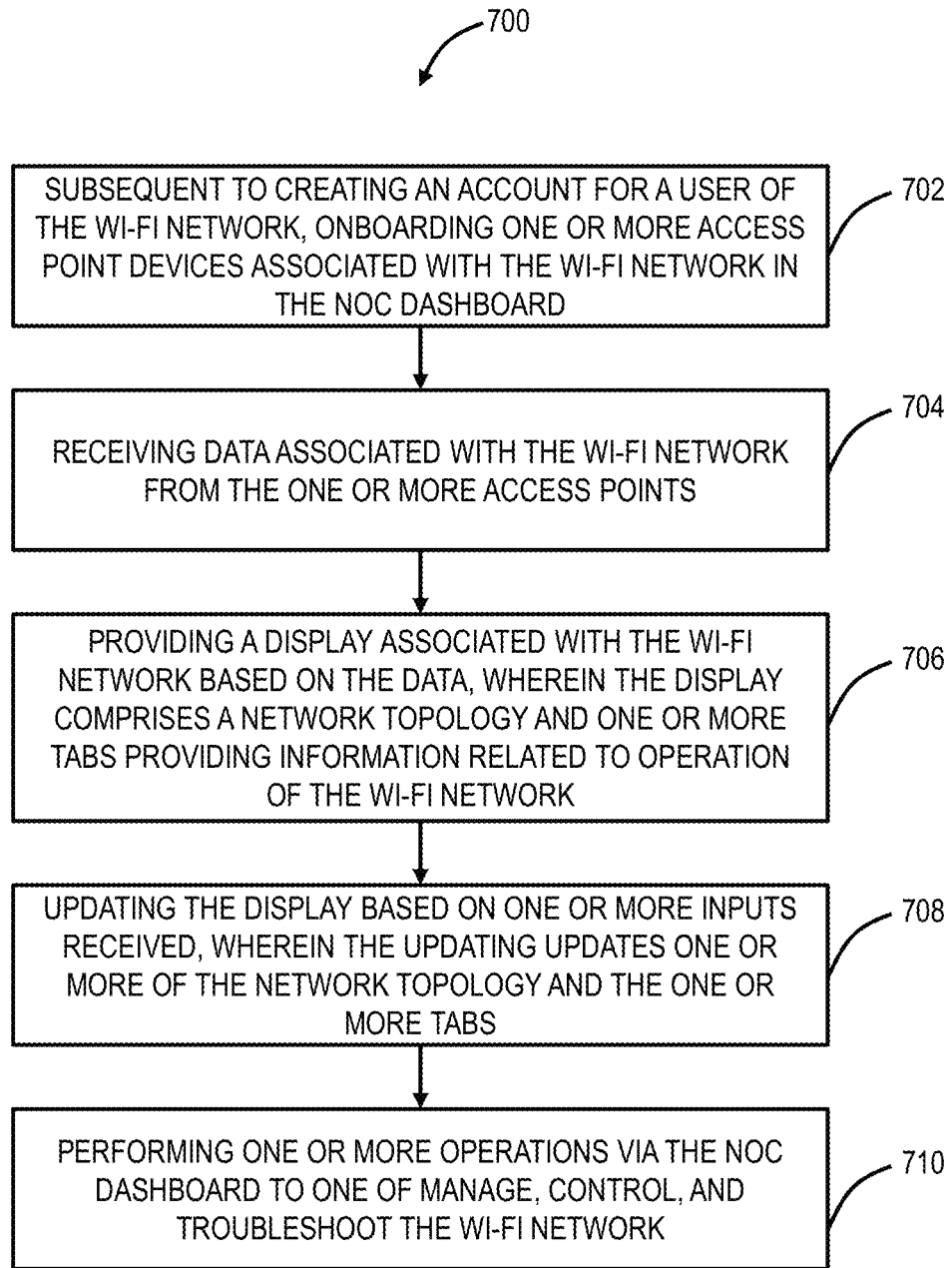
FIG. 43 is a flowchart of a method of managing a Wi-Fi network of a plurality of Wi-Fi networks from a cloud-based Network Operations Control (NOC) dashboard.

Referring to FIG. 43, in an exemplary embodiment, a flowchart illustrates a method 700 of managing a Wi-Fi network of a plurality of Wi-Fi networks from a cloud-based Network Operations Control (NOC) dashboard. The method 700 includes, subsequent to creating an account for a user of the Wi-Fi network, onboarding one or more access point devices associated with the Wi-Fi network in the NOC dashboard (step 702); receiving data associated with the Wi-Fi network from the one or more access points (step 704); providing a display associated with the Wi-Fi network based on the data, wherein the display includes a network topology and one or more tabs providing information related to operation of the Wi-Fi network (step 706); updating the display based on one or more inputs received, wherein the updating updates one or more of the network topology and the one or more tabs (step 708); and performing one or more operations via the NOC dashboard to one of manage, control, and troubleshoot the Wi-Fi network (step 710).

The one or more access point devices can include a plurality of devices such as the access points 14, and wherein the onboarding can include providing a unique identifier of a device and automatically associated all of the plurality of devices to the account based on the unique identifier. For example, the association can be in manufacturing, at the point of sale, etc. such as six access points 14 in a package and any one of the unique identifiers causes all six to be onboarded. The onboarding can include inputting one of serial numbers and Media Access Control (MAC) address for the one or more access point devices in the NOC dashboard.

The onboarding can include receiving an indication of an association between the account and the one or more access point devices from the Wi-Fi network. For example, the access point devices can be configured to communicate to the NOC dashboard once installed. Alternatively, the access point devices can be locally onboarded by a user with an application that communicates the association to the NOC dashboard. Further, the access point devices can be loaded with a control agent, either in manufacturing or during deployment, which communicates to the NOC dashboard.

Subsequent to the receiving, the method 700 can further include storing the data for the Wi-Fi network in a secure manner which is accessible only in the NOC dashboard based on user permission. Of note, the NOC dashboard can support thousands to millions of different Wi-Fi networks under management. As such, there is a need to ensure an administrator can only see authorized data. Also, the secure manner can include anonymizing the data so there is no correlation with the actual end user. This is advantageous when the NOC dashboard manages multiple Wi-Fi networks for different service providers. The aggregate network-wide data is available, albeit in a secure manner.

The performing can include one or more of establishing or changing a Service Set Identifier (SSID) of the Wi-Fi network and establishing or changing a password for accessing the Wi-Fi network. The performing can include setting of network parameters of the Wi-Fi network including one or more of Domain Name System (DNS) settings, Universal Plug and Play (UPnP), Dynamic Host Configuration Protocol (DHCP) reservations, bridge versus router mode, and port forwarding settings. The performing can include causing a specific access point device to provide an indicator for locating by a local user.

For example, controls or actions that can be taken from the NOC dashboard can include, without limitation: the Ability to control operation of the LED, for example, blink it in order for a customer to locate it; claim access point devices; reboot multiple devices in a single location with a single click; redirect access point devices. Redirection refers to the ability to change which carrier (e.g., operator of the NOC dashboard) an Access Point is associated with. For example, an access point pod originally configured to contact the cloud at carrier A, and become part of carrier A's network may subsequently need to be configured to contact the cloud for carrier B so as to become part of carrier B's network. Other controls and actions can include, without limitation: unclaim while preserving (or not) pack IDs (this has to do with which home the access point devices are associated with); enable or disable optimizations, client steering, band steering; manual trigger of log pulls, e.g., a single click captures logs from all devices and moves it to a cloud server; setting of network parameters including DNS settings, DHCP reservations, bridge vs. router mode, port forwarding, UPnP settings; change account password; assign account into multiple groups; reboot individual access point devices or the entire network; freeze devices, with times, etc.

The display can provide graphs of one or more metrics associated with the Wi-Fi network. The display can provide aggregated network-wide statistics and alarms for the plurality of Wi-Fi networks. The display can provide network-wide statistics and alarms for the Wi-Fi network, wherein the network-wide statistics can include a graph of channels used in the Wi-Fi network. The Wi-Fi network can include a distributed Wi-Fi network, and wherein the network topology graphically illustrates client links and backhaul links between a plurality of access point devices.

The one or more tabs can display information related to the one or more access point devices and related to wireless links, wherein a health score is displayed for each of the one or more access point devices and the wireless links, and wherein the health score is a weighted combination of a plurality of factors. The one or more tabs can include a topology time machine which graphically illustrates a topology of the Wi-Fi network and changes over a specified time period. The one or more operations can include an optimization of the Wi-Fi network, and wherein the one or more tabs can include a status of the optimization, a history of optimizations, and statistics associated with the optimization.

In another exemplary embodiment, an apparatus executing a cloud-based Network Operations Control (NOC) dashboard for management of a Wi-Fi network of a plurality of Wi-Fi networks includes a network interface communicatively coupled to the plurality of Wi-Fi networks; a processor communicatively coupled to the network interface; and memory storing instructions that, when executed, cause the processor to, subsequent to creation of an account for a user of the Wi-Fi network, onboard one or more access point devices associated with the Wi-Fi network in the NOC dashboard; receive data associated with the Wi-Fi network from the one or more access points; provide a display associated with the Wi-Fi network based on the data, wherein the display includes a network topology and one or more tabs provide information related to operation of the Wi-Fi network; update the display based on one or more inputs received, wherein the display is updated in one or more of the network topology and the one or more tabs; and perform one or more operations via the NOC dashboard to one of manage, control, and troubleshoot the Wi-Fi network.

In a further exemplary embodiment, a non-transitory computer-readable storage medium includes computer readable code stored thereon for programming a computer to perform the steps of, subsequent to creating an account for a user of the Wi-Fi network, onboarding one or more access point devices associated with the Wi-Fi network in the NOC dashboard; receiving data associated with the Wi-Fi network from the one or more access points; providing a display associated with the Wi-Fi network based on the data, wherein the display includes a network topology and one or more tabs providing information related to operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of managing a Wi-Fi network of a plurality of Wi-Fi networks from a cloud-based Network Operations Control (NOC) dashboard, the method comprising:
   subsequent to creating an account for a user of the Wi-Fi network, receiving data associated with the Wi-Fi network from a plurality of access points, wherein the plurality of access points are onboarded by providing a unique identifier for each access point and automatically associating all of the plurality of access points to the account based on the unique identifier;
   providing a display associated with the Wi-Fi network based on the data, wherein the display comprises a network topology and one or more tabs providing information related to operation of the Wi-Fi network;
   updating the display based on one or more inputs received, wherein the updating updates one or more of the network topology and the one or more tabs;
   performing one or more operations via the NOC dashboard to one of manage, control, and troubleshoot the Wi-Fi network; and
   storing the data for the Wi-Fi network in a secure manner which is accessible only in the cloud-based NOC dashboard based on user permission.

2. The method of claim 1, further comprising:
   grouping the plurality of Wi-Fi networks, the grouping providing one or more of aggregating data by group, displaying information by group, and limiting access to groups based on user permission.

3. The method of claim 1, wherein the performing comprises one or more of establishing or changing a Service Set Identifier (SSID) of the Wi-Fi network and establishing or changing a password for accessing the Wi-Fi network, and further comprising:
   propagating the SSID and the password to the plurality of access points.

4. The method of claim 1, wherein the performing comprises setting of network parameters of the Wi-Fi network comprising one or more of Domain Name System (DNS) settings, Universal Plug and Play (UPnP), Dynamic Host Configuration Protocol (DHCP) reservations, bridge versus router mode, and port forwarding settings.

5. The method of claim 1, wherein the performing comprises causing a specific access point device to provide an indicator for locating by a local user.

6. The method of claim 1, wherein the display dynamically provides metrics for one of more of different frequency bands, different frequency channels, and different time periods.

7. The method of claim 1, wherein the display comprises one or more graphs with indications for both uplink traffic and downlink traffic.

8. The method of claim 1, wherein the display comprises information regarding one or more of channel changes, band steering, and client steering.

9. The method of claim 1, wherein the display indicates capacity of an access point or a portion of the plurality of access points.

10. The method of claim 1, wherein the display indicates a speed of a first device to a second device, wherein the first device and the second device each comprise any of a client device and an access point of the plurality of access points.

11. The method of claim 1, wherein the display indicates a history of software updates to the plurality of access points in the Wi-Fi network.

12. The method of claim 1, wherein the updating the display comprises:
    providing details based on inputs in the network topology, wherein the details are associated with one or more of an access point of the plurality of access points, a client device, and a wireless link.

13. The method of claim 1, wherein the network topology shows both wired and wireless connections.

14. The method of claim 1, wherein the network topology show devices that are offline.

15. The method of claim 1, wherein the display illustrates channel utilization and channel interference separately.

16. The method of claim 1, wherein the display comprises a matrix display used to indicate for a plurality of possible links between the plurality of access points one of signal strength, channel gain, expected data rate, and observed data rate.

17. The method of claim 1, wherein the display comprises a table which indicates for each of the plurality of access points an expected throughput that a client connected to an associated access point could achieve.

18. The method of claim 1, wherein the display provides aggregated network-wide statistics and alarms for the plurality of Wi-Fi networks.

19. The method of claim 1, wherein the Wi-Fi network comprises a distributed Wi-Fi network with the plurality of access points including a plurality of access points, and wherein the network topology graphically illustrates client links and backhaul links between the plurality of access points.

20. The method of claim 1, wherein the network topology utilizes icons that resemble physical shapes of devices in the Wi-Fi network including the plurality of access points and client devices.

21. The method of claim 1, wherein the one or more tabs display information related to the plurality of access points or wireless links, wherein a health score is displayed for each of the plurality of access points or wireless links, and wherein the health score is a weighted combination of a plurality of factors.

22. The method of claim 1, wherein the one or more tabs comprise a topology time machine which graphically illustrates a topology of the Wi-Fi network at various times.

23. The method of claim 1, wherein the one or more operations comprise an optimization of the Wi-Fi network.

24. The method of claim 1, wherein the one or more operations comprise redirection of the plurality of access points from one service provider to another.

25. The method of claim 1, wherein the one or more tabs comprise one or more of a status of an optimization, a history of optimizations, a reason for an optimization, and statistics associated with the optimization.

26. An apparatus executing a cloud-based Network Operations Control (NOC) dashboard for management of a Wi-Fi network of a plurality of Wi-Fi networks, the apparatus comprising:
a network interface communicatively coupled to the plurality of Wi-Fi networks;
a processor communicatively coupled to the network interface; and
memory storing instructions that, when executed, cause the processor to:
subsequent to creation of an account for a user of the Wi-Fi network, receive data associated with the Wi-Fi network from a plurality of access points, wherein the plurality of access points are onboarded by providing a unique identifier for each access point and automatically associating all of the plurality of access points to the account based on the unique identifier;
provide a display associated with the Wi-Fi network based on the data, wherein the display comprises a network topology and one or more tabs provide information related to operation of the Wi-Fi network;
update the display based on one or more inputs received, wherein the display is updated in one or more of the network topology and the one or more tabs;
perform one or more operations via the NOC dashboard to one of manage, control, and troubleshoot the Wi-Fi network; and
storing the data for the Wi-Fi network in a secure manner which is accessible only in the cloud-based NOC dashboard based on user permission.

27. The apparatus of claim 26, wherein the one or more operations comprise one or more of establishing or changing a Service Set Identifier (SSID) of the Wi-Fi network and establishing or changing a password for accessing the Wi-Fi network.

28. The apparatus of claim 26, wherein the one or more operations comprise setting of network parameters of the Wi-Fi network comprising one or more of Domain Name System (DNS) settings, Universal Plug and Play (UPnP), Dynamic Host Configuration Protocol (DHCP) reservations, bridge versus router mode, and port forwarding settings.

29. A non-transitory computer-readable storage medium having computer readable code stored thereon for programming a computer to perform the steps of:
subsequent to creating an account for a user of the Wi-Fi network;
receiving data associated with the Wi-Fi network from a plurality of access points, wherein the plurality of access points are onboarded by providing a unique identifier for each access point and automatically associating all of the plurality of access points to the account based on the unique identifier;
providing a display associated with the Wi-Fi network based on the data, wherein the display comprises a network topology and one or more tabs providing information related to operation of the Wi-Fi network;
updating the display based on one or more inputs received, wherein the updating updates one or more of the network topology and the one or more tabs;
performing one or more operations via the NOC dashboard to one of manage, control, and troubleshoot the Wi-Fi network; and
storing the data for the Wi-Fi network in a secure manner which is accessible only in the cloud-based NOC dashboard based on user permission.

* * * * *